(12) United States Patent
Nelson et al.

(10) Patent No.: US 7,632,916 B2
(45) Date of Patent: *Dec. 15, 2009

(54) PROCESS TO MODIFY POLYMERIC MATERIALS AND RESULTING COMPOSITIONS

(75) Inventors: James M. Nelson, Roseville, MN (US); Ryan E. Marx, Cottage Grove, MN (US); Jeffrey J. Cernohous, Hudson, WI (US); James R. McNerney, Inver Grove Heights, MN (US); Todd D. Jones, St. Paul, MN (US); Kenneth J. Hanley, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1199 days.

This patent is subject to a terminal disclaimer.

(21) Appl. No.: 10/211,415

(22) Filed: Aug. 2, 2002

(65) Prior Publication Data

US 2004/0024130 A1 Feb. 5, 2004

(51) Int. Cl.
*C08F 6/10* (2006.01)

(52) U.S. Cl. ............... 528/502 F; 528/480; 528/503; 525/326.2; 525/326.1; 525/242; 525/491

(58) Field of Classification Search ............... 525/242, 525/326.1, 326.2, 491; 528/480, 481, 451, 528/502 R, 491, 502 F, 503
See application file for complete search history.

(56) References Cited

U.S. PATENT DOCUMENTS

| | | | |
|---|---|---|---|
| 2,803,615 A | 8/1957 | Ahlbrecht et al. | |
| 2,915,554 A | 12/1959 | Ahlbrecht et al. | |
| 3,036,997 A | 5/1962 | Campbell | |
| 3,687,422 A | 8/1972 | List | |
| 3,689,035 A | 9/1972 | List | |
| 3,778,393 A | 12/1973 | Greber et al. | |
| 3,787,351 A | 1/1974 | Olson | |
| 3,880,407 A | 4/1975 | List | |
| 4,039,024 A | 8/1977 | List | |
| 4,086,151 A | 4/1978 | Stevens et al. | |
| 4,172,859 A | 10/1979 | Epstein | |
| 4,346,193 A | 8/1982 | Warfel | |
| 4,415,615 A | 11/1983 | Esmay et al. | |
| 4,458,064 A * | 7/1984 | Chatterjee | 528/501 |
| 4,500,687 A | 2/1985 | Wolfe | |
| 4,533,482 A | 8/1985 | Bollinger | |
| 4,572,819 A | 2/1986 | Priddy et al. | |
| 4,820,778 A | 4/1989 | Ohtani et al. | |
| 4,948,832 A | 8/1990 | Ostermayer et al. | |
| 4,985,486 A | 1/1991 | Westeppe et al. | |
| 5,002,676 A | 3/1991 | Willis et al. | |
| 5,112,918 A | 5/1992 | Boocock et al. | |
| 5,122,571 A | 6/1992 | Westeppe et al. | |
| 5,144,069 A | 9/1992 | Stern et al. | |
| 5,218,053 A | 6/1993 | DuBois | |
| 5,225,496 A | 7/1993 | Yamamoto et al. | |
| 5,227,460 A * | 7/1993 | Mahabadi et al. | 528/272 |
| 5,256,489 A | 10/1993 | Maringer et al. | |
| 5,288,840 A * | 2/1994 | Morishita et al. | 528/238 |
| 5,336,717 A * | 8/1994 | Rolando et al. | 525/64 |
| 5,338,802 A | 8/1994 | DuBois et al. | |
| RE34,791 E * | 11/1994 | Kazmierzak et al. | 525/142 |
| 5,374,688 A | 12/1994 | Besecke et al. | |
| 5,478,886 A | 12/1995 | Kim | |
| 5,480,922 A * | 1/1996 | Mulhaupt et al. | 524/41 |
| 5,571,655 A | 11/1996 | Mahabadi et al. | |
| 5,587,423 A | 12/1996 | Brandstetter et al. | |
| 5,644,007 A * | 7/1997 | Davidson et al. | 526/64 |
| 5,804,625 A | 9/1998 | Temperante et al. | |
| 5,907,017 A | 5/1999 | Ober et al. | |
| 5,917,011 A * | 6/1999 | Duda et al. | 528/501 |
| 6,013,735 A | 1/2000 | Mishra et al. | |
| 6,121,479 A | 9/2000 | Müllner et al. | |
| 6,150,498 A * | 11/2000 | Abel et al. | 528/388 |
| 6,160,054 A | 12/2000 | Schwindeman et al. | |
| 6,184,338 B1 | 2/2001 | Schwindeman et al. | |
| 6,197,891 B1 | 3/2001 | Schwindeman et al. | |
| 6,221,991 B1 | 4/2001 | Letchford et al. | |
| 6,268,532 B1 | 7/2001 | DesMarteau et al. | |
| 6,277,491 B1 | 8/2001 | Sakoda et al. | |
| 6,316,112 B1 | 11/2001 | DuBois et al. | |
| 6,319,881 B1 | 11/2001 | Coolbaugh et al. | |
| 6,350,820 B1 * | 2/2002 | Hahnfeld et al. | 525/332.9 |
| 6,379,791 B1 * | 4/2002 | Cernohous et al. | 428/355 R |
| 6,444,762 B1 | 9/2002 | Fischer et al. | |
| 6,448,353 B1 * | 9/2002 | Nelson et al. | 526/265 |
| 6,521,710 B1 | 2/2003 | Roth et al. | |

(Continued)

FOREIGN PATENT DOCUMENTS

DE 196 52 312 A1 6/1998

(Continued)

OTHER PUBLICATIONS

Symposium: Allen, "Studies on the Synthesis of Novel Block Ionomers, " *Coulombic Interactions in Macromolecular Systems*, ACS Symposium Series 302, American Chemical Society, Aug. 26-31, 1984, Chapter 6, pp. 79-92.

(Continued)

*Primary Examiner*—Douglas Mc Ginty
(74) *Attorney, Agent, or Firm*—Melanie Gover; Daniel R. Pastirik

(57) ABSTRACT

Disclosed is a method for modifying a polymer by carrying out a thermally-induced reaction in a mixing apparatus having a high shear environment and devolatilization capabilities. Also disclosed are the resulting materials.

19 Claims, No Drawings

U.S. PATENT DOCUMENTS

| | | | |
|---|---|---|---|
| 6,586,541 | B2 | 7/2003 | Citron |
| 6,613,870 | B1 * | 9/2003 | Harder et al. ............... 528/481 |
| 6,649,719 | B2 | 11/2003 | Moore et al. |
| 6,716,935 | B1 | 4/2004 | Nelson et al. |
| 6,737,026 | B1 | 5/2004 | Bergh |
| 6,749,814 | B1 | 6/2004 | Bergh |
| 6,753,373 | B2 | 6/2004 | Winowiecki |
| 6,852,781 | B2 | 2/2005 | Savu et al. |
| 6,890,493 | B1 | 5/2005 | Bergh |
| 6,902,934 | B1 | 6/2005 | Bergh |
| 7,157,283 | B2 * | 1/2007 | Nelson et al. ................. 436/37 |
| 2001/0027234 | A1 | 10/2001 | Binder et al. |
| 2002/0007083 | A1 | 1/2002 | DesMarteau et al. |
| 2002/0010267 | A1 | 1/2002 | Klaerner et al. |
| 2002/0128336 | A1 | 9/2002 | Kolb et al. |
| 2002/0170976 | A1 | 11/2002 | Bergh |
| 2003/0035917 | A1 | 2/2003 | Hyman |
| 2003/0236369 | A1 | 12/2003 | Komoriya et al. |
| 2004/0023398 | A1 * | 2/2004 | Nelson et al. ................. 436/37 |
| 2004/0265188 | A1 | 12/2004 | Marx et al. |

FOREIGN PATENT DOCUMENTS

| | | |
|---|---|---|
| DE | 19715035 | 10/1998 |
| DE | 199 10 810 A1 | 9/2000 |
| DE | 199 10 811 A1 | 9/2000 |
| EP | 0 076 691 * | 4/1983 |
| EP | 0 603 965 A2 | 6/1994 |
| JP | 4-63802 | 2/1992 |
| JP | 04-063820 | 2/1992 |
| JP | 4-110315 | 4/1992 |
| JP | 8-193107 | 7/1996 |
| JP | 09-277464 | 10/1997 |
| JP | 10-130348 | 5/1998 |
| JP | 2002-161110 | 6/2002 |
| WO | WO 96/07522 | 3/1996 |
| WO | WO 96/07674 | 3/1996 |
| WO | WO 97/40929 | 11/1997 |
| WO | WO 00/42084 | 7/2000 |
| WO | WO 01/30873 * | 5/2001 |
| WO | WO 01/91723 A2 | 12/2001 |
| WO | WO 02/081079 | 10/2002 |

OTHER PUBLICATIONS

Book Excerpt: Greene et al., *Protective Groups in Organic Synthesis*, Second Edition, John Wiley & Sons, Inc., (1991), p. 41.

Book Excerpt: Greene et al., *Protective Groups in Organic Synthesis*, Second Edition, John Wiley & Sons, Inc., (1991), pp. 80-83.

Article Abstract: Kassis et al, "XPS Studies of Fluorinated Acrylate Polymers and Block Copolymers with Polystyrene," *Macromolecules*, (1996), vol. 29, No. 9, pp. 3247-3254.

U.S. Appl. No. 09/500,155, filed Feb. 8, 2000, Continuous Process for the Production of Controlled Architecture Materials.

U.S. Appl. No. 09/824,330, filed Apr. 2, 2001, A Continuous Process for the Production of Combinatorial Libraries of Materials.

U.S. Appl. No. 10/211,219, filed Aug. 2, 2002, Continuous Process for the Production of Combinatorial Libraries of Modified Materials.

U.S. Appl. No. 10/211,096, filed Aug. 2, 2002, Fluorinated Polymers.

Article: Busse et al., "Synthesis of Amphiphilic Block Copolymers Based on *tert*-Butyl Methacrylate and 2-(N-Methylperfluorobutanesulfonamido)ethyl Methacrylate and Its Behavior in Water," *Macromolecules*, vol. 25, (2002), pp. 178-184.

Literature Examples: Baker et al., "PS/PE Blend," *Polymer*, vol. 28, (1987), p. 2057.

Literature Examples: Hobbs et al., "PE/PA 6,6 Blend," *Polym. Eng. Sci.*, vol. 23, (1983), p. 380.

Article: Guegan at al., "Anionic Synthesis, Modification, and Characterization of ABC Triblock Copolymers," *Macromolecules*, vol. 29, No. 13, (1996), pp. 4605-4612.

Article: Barclay et al., "The 'Living' Free Radical Synthesis of Poly(4-hydroxystyrene): Physical Properties and Dissolution Behavior," *Macromolecules*, vol. 31, No. 4, (1998), pp, 1024-1031.

Article: Yang et al., "Clustering of Poly(methacrylic acid) around Appended Binaphthyl Labels as Reflected by the Disruption of γ-Cyclodextrin Complexation and Racemization Kinetics," *Macromolecules*, vol. 32, No. 8, (1999), pp. 2577-2584.

Article: Leyh et al., "Shear-Induced Order in Aqueous Micellar Solutions of Amphiphilic Poly(*tert*-butylstyrene)-*b*-poly(Na methacrylate) Diblock," *Macromolecules*, vol. 31, No. 26, (1998), pp. 9258-9264.

Article: Creutz at al., "Effectiveness of Poly(vinylpyridine) Block Copolymers as Stabilizers of Aqueous Titanium Dioxide Dispersions of a High Solid Content," *Langmuir*, vol. 15, No. 21, (1999), pp. 7145-7156.

Article: Wang et al., "Synthesis of AB(BA), ABA and BAB Block Copolymers of *tert*-Butyl Methacrylate (A) and Ethylene Oxide (B)," *Journal of Polymer Science: Part A: Polymer Chemistry*, vol. 30, (1992), pp. 2251-2261.

Article: Huang et al., "Hydrogel-Coated Glassy Nanospheres: A Novel Method for the Synthesis of Shell Cross-Linked Knedels," *J. Am. Chem. Soc.*, vol. 119, No. 48, (1997), pp. 11653-11659.

Article: Lewandowski et al., "Polar, Monodisperse, Reactive Beads from Functionalized Methacrylate Monomers by Staged Templated Suspension Polymerization," *Chem. Mater.*, vol. 10, No. 1, (1998), pp. 385-391.

Article: Lai, "Thermal Behavior of Random Copolymers of Methacrylic Acid and *tert*-Butyl Methacrylate," *Macromolecules*, vol. 17, No. 5, (1984), pp. 1010-1012.

Article: Peters et al., "Termination of Living Anionic Polymerizations Using Chlorosilane Derivatives: A General Synthetic Methodology for the Synthesis of End-Functionalized Polymers," *J. Am. Chem. Soc.*, vol. 117, No. 12, (1995), pp. 3380-3388.

Article: Moon et al., "Synthesis of *end*- and *mid*-Phthalic Anhydride Functional Polymers by Atom Transfer Radical Polymerization," *Macromolecules*, vol. 34, No. 23, (2001), pp. 7941-7951.

Article: Deporter et al., "Methacrylate-Based Block Ionomers I: Synthesis of Block Ionomers Derived from *t*-Butyl Methacrylate and Alkyl Methacrylates," *Polymer International*, vol. 33, No. 2, (1994), pp. 205-216.

Marc R. Nyden, et al., "Development of a Continuous Flow Flame Test Extruder for Hight-Throughput Formulation and Screening of Flame Retardants and More Fire Resistant Materials", Fire Safety Developments Emerging Needs, Product Developments, Non-Halogen Fr's, Standards and Regulations, Proceedings, Fire Retardant Chemicals Association, pp. 1-5, Mar. 12-15, 2000.

Enright, T.E., et al., "Nitroxide-Mediated Polymerization of Styrene in a Continuous Tubular Reactor", *Macromolecular Rapid Communications*, vol. 24, No. 4, pp. 221-225 (Feb. 7, 2005).

US 6,492,477, 12/2002, Savu et al. (withdrawn)

* cited by examiner

PROCESS TO MODIFY POLYMERIC MATERIALS AND RESULTING COMPOSITIONS

FIELD OF INVENTION

The present invention relates to a process for the modification of polymeric materials.

BACKGROUND

The modification of polymers can produce materials with considerable commercial applicability, finding uses as dispersants, blend compatibilizers, surfactants, surface modifiers, colloidal stabilizers, stain release agents, encapsulants, binding agents, viscosity modifiers, and (in some cases) precursors to ionomers. Important synthetic targets within this area are polymers containing carboxylic acid, hydroxyl, amine or thiol segments, due to their high polarity and water miscibility.

Additionally, modified materials containing hydroxyl or (more importantly) acid/anhydride functional groups are of interest for reactive grafting or blending applications, due to the ability of the anhydride to interact with monomeric or oligomeric amines and alcohols resulting in grafted block copolymers. Reactive blend compatibilization can also be achieved through use of these functional block copolymers.

SUMMARY OF THE INVENTION

An ongoing need exists for an efficient and controlled process for synthesizing polymers via modification. Modification includes rearrangement of a polymer molecule and deprotection of protected segments of a polymer to expose a reactive functional group. A moiety may then, optionally, be grafted onto the functional group. The ability to efficiently and cleanly modify a polymer in a cost-effective process that can be easily scaled up is needed. The present invention addresses these needs.

Briefly, one aspect of the present invention provides a method for modifying a polymer comprising: providing a mixing apparatus having a high shear environment and devolatilization capabilities, introducing into the apparatus a composition containing at least one polymer that can be modified by a thermally-induced reaction, exposing the composition to the high shear environment at a temperature of about 100° C. to about 180° C., whereby a thermally-induced reaction occurs and volatile by-product is removed.

The composition may comprise 90 weight % solids or less when introduced into the apparatus. The composition may comprise at least one polymer that is temperature sensitive.

The thermally-induced reaction may remove at least one protective group to expose a functional group, which may be capable of undergoing a grafting reaction. The functional group may be ethylenically or acetylenically unsaturated. Subsequently, an in situ chemical reaction at the functional group may occur. For example, a graft polymer may be formed.

Virtually any thermally-induced reaction may be carried out per the present invention. The thermally-induced reaction may comprises the elimination of isobutylene and water from methacrylic and acrylic esters to produce one or both of acid and anhydride functionalities, and may be catalyzed, e.g., acid-catalyzed. The thermally-induced reaction may comprise the elimination of trialkylsilanes from trialkylsiloxy end or side group containing polymers to produce hydroxyl end or side group functional polymers. The thermally-induced reaction may comprises the elimination of trialkylsilanes from trialkylsilazane end or side group containing polymers to produce amino end or sidegroup functional polymers. The thermally-induced reaction may comprise a deesterification reaction to produce hydroxyl- or carboxylic acid-functionalized polymers, and may be base-catalyzed. The thermally-induced reaction may comprise the elimination of $N_2$ from acyl azides and subsequent rearrangement to form isocyanate functionality. The thermally-induced reaction may comprise the elimination of benzenesulfenic acid from poly(vinyl phenyl sulfoxide) to produce polyacetylene-containing polymers. The thermally-induced reaction may comprise the elimination of trialkylsilanes from trialkylsilthiane end or sidegroup containing polymers to produce thiol end or side group functional polymers. The thermally-induced reaction may comprise the elimination of trialkylsilanes from trialkylsilyl-substituted ethynyl monomers, such as 2-, 3- and 4-[(trimethylsilyl)-ethynyl]styrenes, producing ethynyl-containing side-group or end functionalized polymers.

The mixing apparatus used to carry out the method may comprise a high viscosity devolatilizer or a devolatilizing kneader.

Another aspect of the invention is a composition of matter comprising a controlled architecture material comprising at least one diene block and at least one (meth)acrylic anhydride block, and optionally, at least one styrenic block. The composition may comprise a hydrogenated poly(diene-(meth) acrylic anhydride) controlled architecture material. The diene may be selected from the group consisting of isoprene, butadiene, and cyclohexadiene.

Another aspect of the invention is a composition of matter comprising a controlled architecture material comprising at least one styrenic block and at least one block containing N-methylperfluorobutanesulfonamido. The composition may comprise a poly(styrenic-(meth)acrylic anhydride-2-(N-methylperfluorobutanesulfonamido) controlled architecture material. The composition may comprise a poly(styrenic-(meth)acrylic acid-2-(N-methylperfluorobutanesulfonamido) controlled architecture material.

Another aspect of the invention is a composition of matter comprising a controlled architecture material comprising at least one diene block and at least one block containing N-methylperfluorobutanesulfonamido. The composition may further comprise a (meth)acrylic anhydride block and/or a (meth)acrylic acid block Another aspect of the invention is a composition of matter comprising a controlled architecture material comprising at least one diene block and at least one (meth)acrylic acid-co-(meth)acrylic anhydride block. The composition may optionally further at least one styrenic block and/or at least one perfluoroalkyl (meth)acrylate block containing at least one mer unit having the formula

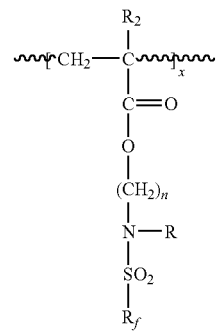

where ⁓ represents a bond in a polymerizable or polymer chain; $R_f$ is $-C_6F_{13}$, $-C_4F_9$, or $-C_3F_7$; R and $R_2$ are each independently hydrogen or alkyl of 1 to 20 carbon atoms; n is an integer from 2 to 11; and x is an integer of at least 1. 5 Another aspect of the invention is a composition of matter comprising at least one styrenic block, at least one (meth)acrylic acid-co-(meth)acrylic anhydride block, and at least one perfluoroalkyl (meth)acrylate block containing at least one mer unit having the formula

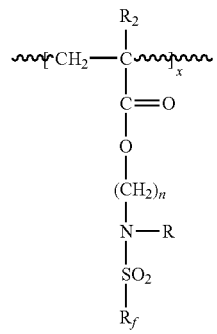

where ⁓ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

As used herein:

"block copolymer" means a polymer having at least two compositionally discrete segments, e.g., a di-block copolymer, a tri-block copolymer, a random block copolymer, and a star-branched block copolymer;

"continuous" means that reactants enter a reactor at the same time (and, generally, at the same rate) that polymer product is exiting the same reactor;

"devolatilizing kneader" means an apparatus that provides mixing or kneading action and is capable of operation under vacuum sufficient to remove volatile by-products;

"di-block copolymer" or "tri-block copolymer" means a polymer in which all the neighboring monomer units (except at the transition point) are of the same identity, e.g., -AB is a di-block copolymer comprised of an A block and a B block that are compositionally different, ABA is a tri-block copolymer in which the A blocks are compositionally the same, but different from the B block, and ABC is a tri-block copolymer comprised of A, B, and C blocks, each compositionally different;

"end functionalized" means a polymer chain terminated with a single functional group on one or both chain ends;

"functional group" means an appended moiety capable of undergoing a reaction;

"high shear environment" means mixing conditions in which physical mixing elements provide shear stress and intense mixing to blend materials having high melt viscosities;

"high viscosity devolatilizer" means an apparatus that provides a high shear mixing environment and a vacuum sufficient to remove volatile by-products from a material or mixture of materials;

"hydrogenated" means fully or partially hydrogenated; i.e., hydrogen has been added to all or some double bonds of an unsaturated molecule;

"in situ grafting" means a grafting reaction is carried out on a material that has been functionalized during the same process run; i.e., the material is not removed from the reactor between the functionalizing and grafting reactions;

"living anionic polymerization" means, in general, a chain polymerization that proceeds via an anionic mechanism without chain termination or chain transfer. (For a more complete discussion of this topic, see *Anionic Polymerization Principles and Applications*. H. L. Hsieh, R. P. Quirk, Marcel Dekker, NY, N.Y. 1996. Pg 72-127);

"living end" means a stable radical, cation, or anion capable of undergoing further polymerization reactions;

"modify" means perform a reaction to change the chemical nature of a material or a mixture of materials by physical and/or chemical reactions;

"plug" means a three dimensional slice of the reaction mixture;

"plug flow reactor (PFR)" means a reactor that ideally operates without axial mixing (see *An Introduction to Chemical Engineering Kinetics and Reactor Design*; Charles G. Hill, J. Wiley and Sons 1977, p. 251) or shows no radial variation in concentration as materials are consumed as they travel in the axial direction (see *Elements of Chemical Reaction Engineering*; H. Scott Fogler Prentice Hall, 1999.

"protected functional group" means a functional unit that is reactive after the removal of a "protective" group that prevents reaction at a particular site; "temperature-sensitive polymer" means a polymer susceptible to significant side reactions, such as degradation, or increased polydispersity index, as the reaction temperature rises;

"random block copolymer" means a copolymer having at least two distinct blocks wherein at least one block comprises a random arrangement of at least two types of monomer units;

"star-branched block polymer" or "hyper-branched block copolymer" means a polymer consisting of several linear block chains linked together at one end of each chain by a single branch or junction point, also known as a radial block copolymer (See *Anionic Polymerization Principles and Applications*. H. L. Hsieh, R. P. Quirk, Marcel Dekker, NY, N.Y. 1996. Pg 333-368);

"styrenic" means a styrene molecule with any type of substituent;

"temperature sensitive monomer" means a monomer susceptible to significant side reactions such as degradation, cross-linking, and chain scission with reactive sites, such as carbonyl groups, on the same, or different, polymer chain as the reaction temperature rises; and "thermally-induced reaction" means a reaction that is induced or driven by heat.

An advantage of at least one embodiment of the present invention is that functionalizations can be performed, solvent free, under milder conditions (i.e., at lower temperatures and for shorter times) than in bench-scale batch processes that lack appropriate mixing capability. This can provide significant economic and environmental advantages.

An advantage of at least one embodiment of the present invention is that faster reaction times can be achieved for thermally-induced reactions that produce volatile by-products, as compared to the same reactions carried out in a solution process (0.5-1 hour compared to 8 hours). This is due to the ability to drive the reaction by drawing off the volatile byproducts. An advantage of at least one embodiment of the present invention is that for anhydride formation, lower reaction temperatures (120-150° C.) can be used than in the typical thermal processes (operated at 200-250° C.), such as extrusion or bench-scale batch processes lacking high viscosity mixing capability. An advantage of at least one embodiment of the present invention is that it produces materials substantially free of by-products without the need for precipitation or lengthy drying procedures.

An advantage of at least one embodiment of the present invention is the ability to produce and process polymers having long chains comprising deprotected groups and long chains of functionalized materials. In solution modification processes, long polar or functional group segments often show reduced solubility in solvents and show increased viscosity due to hydrogen bonding considerations. Such problems are avoided in at least one embodiment of the present invention because modifications are performed in a solvent-free environment.

An advantage of at least one embodiment of the present invention is that the continuous nature of the process and ability to use the process in combination with other continuous processes results in a very cost-effective method for producing materials.

An advantage of at least one embodiment of the present invention is that the process can be easily scaled-up to produce large quantities of product.

An advantage of at least one embodiment of the present invention is that the process does not cause significant polymer degradation.

An advantage of at least one embodiment of the present invention is that the extent of modification can be adjusted by varying the extent of thermal exposure, for example, by varying residence time. For example, the ratio of acid to anhydride moieties can be controlled in the thermal modification of (meth)acrylic esters.

An advantage of at least one embodiment of the present invention is that monomeric or oligomeric/polymeric amines and alcohols may be blended with suitable reactive or modifiable methacrylate ester materials during thermal modification to produce transesterified or grafted materials in one easy step. This can allow the synthesis of new and novel materials, not directly accessible by current synthesis routes.

DETAILED DESCRIPTION

One aspect of the present invention employs thermally-induced reactions to modify polymeric materials. Many types of thermally-induced reactions are suitable for the present invention. One suitable type of reaction is a rearrangement reaction in which the substituents or moieties of a molecule are rearranged to form a new molecule, i.e., the bonding site of a substituent or moiety moves from one atom to another in the same molecule. Another suitable type of reaction is an elimination reaction in which one or more substituents is removed from a molecule. Specific types of reactions that can be carried out include, but are not limited to, pyrolysis reactions, acid-catalyzed reactions, deprotection reactions, condensation reactions, hydrolysis reactions, imidization reactions, base-catalyzed reactions, and deesterification, e.g., deacetylation. In a pyrolysis reaction, a complex molecule is broken into simpler units by the use of heat. In an acid-catalyzed reaction, acid is used to drive or induce the thermal reaction. In a deprotection reaction, a protecting group is removed to expose a reactive functional group. In a condensation reaction, two molecules react to form a new molecule and release a byproduct, which is typically water. In a hydrolysis reaction, water reacts with another molecule (e.g., ester) to form one or more new molecules. In an imidization reaction, anhydrides react with primary amines via an intermediate amic acid functionality to form an imide ring and water. In a base-catalyzed reaction, base is used to drive or induce the thermal reaction. In a deesterification reaction, an ester is converted into a carboxylic acid or an anhydride. In a deacetylation reaction, an ester is converted into an alcohol with removal of an acetyl group. See, for example, Hawker et al., *Macromolecules*, 1998, 31, 1024.

One type of reaction may be followed by a subsequent reaction. For example, the acid catalyzed desterification or modification reaction of poly(meth)acrylic esters to form polymethacrylic acid is followed by a condensation reaction to form polymethacylic anhydride or a functional group exposed by a deprotection reaction may then be further reacted, e.g., by grafting a moiety to the deprotected site.

Once the initial reaction has occurred, further reactions, such as hydrolysis, condensation and in situ grafting may be performed.

Reactor System

The thermally-induced reactions of the present invention are carried out in a mixing apparatus that provides a high shear environment and has devolatilization capabilities. The intensive mixing provided by a high shear environment continually brings different portions of the reacting mixture to the surface of the bulk of mixture material. At the bulk surface, reaction products are exposed to the vacuum in the apparatus. The vacuum causes the lower molecular weight products, which are typically undesirable by-products, to be drawn out of the reacting mixture. Removal of the by-products causes the kinetics to favor additional reactions. Accordingly, as the mixture moves through the mixing apparatus, the desired (higher molecular weight) product is continuously produced, and remains in the mixture, while undesired (low molecular weight) by-products are removed from the mixture. The high shear and devolatilization characteristics of the apparatuses used in the present invention, which provide a favorable reaction equilibrium, allow the thermally-induced reactions to be carried out at temperatures lower than would otherwise be required. The ability to use lower temperatures provides the added advantage of enabling the production of molecules that could not be made previously due to problems with, e.g., thermal degradation and crosslinking.

In the present invention, reactions are typically carried out at temperatures of about 100° C. to about 180° C. Many reactions that can be carried out per the present invention normally require higher temperatures, e.g., 200° C. or higher because the apparatus used do not provide efficient mixing and heat transfer. The higher temperatures are needed to ensure that the inner portions of the bulk material are sufficiently heated to drive the reaction. However, these higher temperatures can have detrimental effects, such as polymer degradation, as explained above.

Even though the high shear environment and devolatilization characteristics of the apparatus of the present invention allow reactions to be carried out at temperatures lower than would otherwise be required, most of the processes are carried out at above-ambient temperatures. When the polymer and/or the reaction mixture is processed at above-ambient temperatures, addition of a thermal stabilizer to the reaction mixture is preferred. A variety of thermal stabilizers, including hindered phenols and phosphites, are widely used in the industry. Whichever stabilizer is used, it is preferably soluble in the reaction mixture and products; otherwise, a solvent will be necessary as a delivery mechanism.

The methods of the present invention can be carried out using batch or continuous processes. Methods of the present invention are particularly advantageous for use with continuous systems such as those described in copending U.S. patent application Ser. No. 09/500,155, having the title "Continuous Process for the Production of Controlled Architecture Materials," because the apparatus of the present invention can be set up in series with a polymer-producing apparatus so that the starting polymeric material is fed directly into the mixing apparatus.

The mixing apparatuses of the present invention are capable of handling highly viscous polymer melts. For example, they can process polymer melts having viscosities as high as about 500,000 cps (500 Pascal (Pa) seconds) and solids concentrations of about 1 to about 90 weight %. They can process these high viscosity materials at residence times of about 10 to about 60 minutes. The mixing apparatuses also have devolatilization capabilities. The apparatuses may come standard with vacuum equipment or may be fitted with vacuum equipment. The apparatuses can maintain a vacuum of about 1 to about 200 torr (about 133 to about 26660 Pa) under high viscosity mixing conditions.

The mixing apparatus are also, preferably, temperature-controlled. The apparatuses may have one or more temperature-controlled zones. If the apparatus has more than one temperature-controlled zone, a temperature gradient can be maintained through the mixing apparatus. This can be advantageous in many situations, for example when carrying out an exothermic reaction, because the need for heat removal can vary throughout the reactor, depending on the reaction being carried out.

Apparatuses that are suitable for the present invention include high viscosity processors and vacuum-fitted high performance kneaders. These apparatuses provide a high shear environment, devolatilization capabilities, and, optionally, temperature-controlled zones.

A suitable high viscosity processor, which comes standard with vacuum equipment, is a LIST Discotherm B processor (available from List AG, Acton, Mass.). The LIST Discotherm B high viscosity processor (described in more detail in the Examples section) is ideally suited for use in the present invention. It provides intensive mixing and kneading in combination with large heat-transfer surfaces and long residence times thereby enabling the reaction and the removal of by-products to take place with great ease. The heat transfer surfaces are continuously swept by kneading elements, which increases thermal efficiency and ensures high heat transfer rates. The LIST's inner cavity also provides a large working volume (i.e., volume occupied by the reaction mixture) and fill level, thus allowing for high throughput and long retention times. Also, the working volume occupies only about 60% of the total volume of the reactor, which provides ample room to allow for disengagement and flashing of off-gases and vapors as they are brought to the bulk surface by the intensive mixing.

Suitable kneaders, fitted with a vacuum system, include an MKD 0,6-H 60 IKA kneader (described in more detail in the Examples section), Buss kneaders (available from Coperion Buss AG, Pratteln, Switzerland), and Srugo Sigma kneaders (available from Srugo Machines Engineering, Netivot, Israel). The kneaders are fitted with vacuum equipment by attaching a vacuum pump to vacuum ports on the kneader.

Process Variables

The production of desired modified polymers can be obtained by controlling various process variables. Process variables can influence, for example, the speed at which, and extent to which, a reaction takes place, and ratio of functional groups produced. Variables that can be changed when conducting the method include: concentration or composition of starting material, type of starting material, pressure (i.e., vacuum) in the mixing apparatus, temperature and/or temperature profile in the reactor, type and amount of component or grafting agent added, degree of mixing, residence time, and where and when additional components are introduced into the high viscosity reactor. For example, the level of deprotection can be increased by increasing the temperatures and/or increasing the vacuum levels to affectively remove byproducts. If less deprotection, modification or elimination is desired the vacuum level can be lessened or the temperature can be lowered.

The variables may be changed in a continuous manner or a stepwise manner. The ability to control feed flows, feed locations, and compositional variations in a high viscosity reactor provides an opportunity to produce a variety of compositions in a continuous, economical, and scalable fashion.

Starting Polymer Systems

Suitable starting polymeric materials include controlled architecture materials (CAM), which are polymers of varying topology (linear, branched, star, star-branched, combination network), composition (di-, tri-, and multi-block copolymer, random block copolymer, random copolymers, homopolymer, graft copolymer, tapered or gradient copolymer, star-branched homo-, random, and block copolymers), and/or functionality (end, site specific, telechelic, multifunctional, macromonomers).

The invention allows the modification of polymers synthesized by step growth polymerizations, specifically tradition or living/controlled free radical, group transfer, cationic or living anionic polymerizations. Suitable starting polymers include the fluorinated materials described in co-pending patent application U.S. Ser. No. 10/211,096, incorporated by reference. Of most industrially relevant are tradition or living/controlled free radical and living anionic polymerizations.

The starting polymeric materials may be made by any method known in the art. For example, the may be made by the method described in copending U.S. patent application Ser. No. 09/500,155.

The starting polymer systems may be synthesized in processes that are carried out in batch, semibatch, continuous stirred tank reactor (CSTR), tubular reactors, stirred tubular reactors, plug flow reactors (PFR), temperature controlled stirred tubular reactors as described in WO 0158962 A1 and co-pending U.S. patent application Ser. No. 09/824,330, static mixers, continuous loop reactor, extruders, shrouded extruders as described in WO 9740929, and pouched reactors as described in WO 9607522 and WO 9607674. The media in which the polymerizations may take place are bulk, solution, suspension, emulsion, ionic liquids or supercritical fluids, such as supercritical carbon dioxide.

Specific methods of making the starting polymer systems include atom transfer radical polymerization (ATRP), reversible addition-fragmentation chain transfer polymerization (RAFT), and nitroxyl or nitroxide (Stable Free Radical (SFR) or persistant radical)-mediated polymerizations. These controlled processes all operate by use of a dynamic equilibrium between growing radical species and various dormant species (see Controlled/Living Radical Polymerization, Ed. K. Matyjaszewski, ACS Symposium Series 768, 2000).

Suitable starting materials include those with a terminal unsaturated carbon-carbon bond, such as anionically-polymerizable monomers (see Hsieh et al., *Anionic Polymerization: Principles and Practical Applications*, Ch. 5, and 23 (Marcel Dekker, New York, 1996) and free radically-polymerizable monomers (Odian, *Principles of Polymerization*, $3^{rd}$ Ed., Ch. 3 (Wiley-Interscience, New York, 1991.

At least one aspect of this invention provides utility in particular for temperature-sensitive polymers. Examples of temperature sensitive polymers include poly(styrenes), poly(dienes), poly((meth)acrylates), and mixtures thereof, as well as polymeric systems that degrade at elevated temperatures over long periods of time.

Other suitable monomers include those that have multiple reaction sites. For example some monomers may have at least two anionically-polymerizable sites. This type of monomer will produce branched polymers. This type of monomer preferably comprises less than 10 molar percent of a given reaction mixture because larger amounts tend to lead to a high degree of crosslinking in addition to branching. Another suitable monomer is one that has at least one functionality that is not anionically-polymerizable in addition to at least one anionically polymerizable site.

Polyolefin-based CAM's are also suitable materials for the modification reactions of the present invention. These polyolefin CAM's may be made by hydrogenation of polydiene systems. Particularly useful are hydrogenated poly(butadiene), polyisoprene poly(1,3-pentadiene), and poly(1,3-cyclohexadiene), which can be synthesized via "living" anionic polymerization. Hydrogenation of such polydienes produces various polyolefins, the nature of which is controlled by the polymer backbone microstructure. For example hydrogenation of poly(1,4-butadiene) produces a polyethylene-like structure, while hydrogenation of poly(1,2-butadiene) produces a polyethylethylene (ie. polybutylene) structure.

This ability to hydrogenate and subsequently modify polyolefin-based CAM's can be used to produce dispersants, compatibilizers, tie layers, and surface modifiers that are unique, polyolefin-miscible, and industrially-useful.

Hydrogenation of polymer blocks can be performed by various routes including homogeneous diimide reduction as described by Hahn in *J. Polym. Sci:Polym Chem.* 1992, 30, 397, and by heterogeneous Pd catalyzed reduction as described by Rachapudy et al. *J. Polym. Sci; Polym Phys. Ed.,* 1979, 17, 1211. The diimide reduction involves the use of organic reducing agents such as p-toluenesulfonhydrazide in the presence of a trialkyl amine (e.g., tripropyl amine) and xylene as a solvent at temperatures of 140° C.

Fluorinated materials, such as perfluorinated (meth)acrylates, are also suitable for use in the present invention. Fluorinated monomer units may comprise co-monomers in the materials of the present invention. The fluorinated materials may comprise, for example, a backbone mer unit having the following Formula I

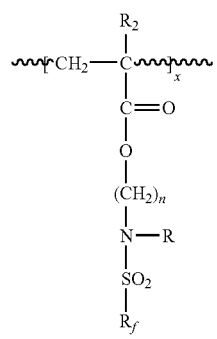

where ∼∼∼ represents a bond in a polymerizable or polymer chain; $R_f$ is $—C_6F_{13}$, $—C_4F_9$, or $—C_3F_7$; R and $R_2$ are each independently hydrogen or alkyl of 1 to 20 carbon atoms; n is an integer from 2 to 11; and x is an integer of at least 1. An example of a Formula I structure is N-methylperfluorobutanesulfonamido. The fluorinated materials may be end-functionalized at one or both terminus with reactive end groups. If there are two reactive end groups, they may be the same or different. Fluorinated diene, methacrylate and styrenic homo and block copolymers end-functionalized with alcohol(s), thiol(s), and/or amine(s) may be synthesized anionically by the use of suitable anionic initiators which contain protected functional groups that can be removed by post polymerization techniques. Suitable functional initiators are known in the art and are described in, e.g., U.S. Pat. No. 6,197,891, U.S. Pat. No. 6,160,054, U.S. Pat. No. 6,221,991, and U.S. Pat. No. 6,184,338.

The fluorinated materials may be made by the same living anionic polymerization methods previously described. A more detailed description of some suitable fluorinated materials is in co-pending patent application U.S. Ser. No. 10/211, 096.

Thermally-Induced Reactions

As previously stated, a variety of thermally-induced reactions may be carried out on starting materials using the processes of the present invention. This section provides non-limiting examples of reactions that can be carried out.

One suitable reaction is the rearrangement of an acyl azide to provide an isocyanate group (i.e., a Curtius rearrangement) as shown in Formula I

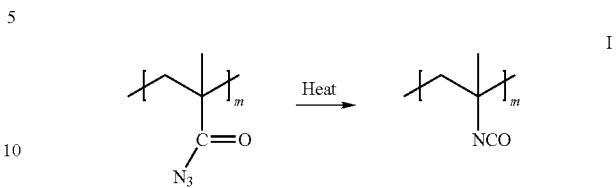

In this reaction $N_2$ is eliminated and a nitrogen atom replaces the carbon atom that is attached to the polymer backbone to form an isocyanate functionality.

Various reactions may be carried out to produce acetylene-containing polymers. In these reactions, a sulfoxide is pyrolyzed to give the polyactylene and a sulfenic acid byproduct (RSOH) as shown in Formula II. For example, a benzenesulfenic acid may be eliminated from poly(phenyl vinyl sulfoxide)-containing copolymers to produce polyacetylene-containing copolymers, such as poly(styrene-acetylene) block copolymers. Polyacetylene is typically difficult to work with because it is very insoluble in other materials. However, including it in a block structure allows the final structure to remain soluble.

Vinyl sulfoxides having the general structure $CH_2=CH—SOR$ are suitable for polymerization. Applicable R groups include primary alkyl, aryl, and alkylaryl-amines, for example, an alkyl group having 1 to 10 carbon atoms, a cycloalkyl group having 5 to 12 carbon atoms, an aralkyl group having 7 to 22 carbon atoms or an aryl group having 6 to 12 carbon atoms.

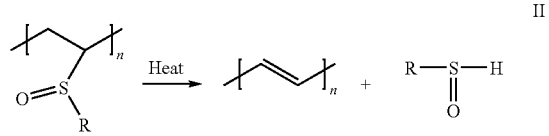

In other suitable reactions, polymeric materials containing methacrylic and acrylic esters can be modified, e.g., functionalized or deesterified, by treatment with catalytic amounts of acid at above-ambient temperatures. The treatment with acid at above-ambient temperature causes ester alkyl-oxygen cleavage, resulting in the release of relatively volatile aliphatic reaction products to form (meth)acrylic acid functionalized polymers, followed by (in some cases) the release of water via a condensation reaction to form (meth)acrylic anhydride functionalized polymers as shown in Formula III. This method can be applied to a vast array of polymeric reagents to produce acid and anhydride functionality.

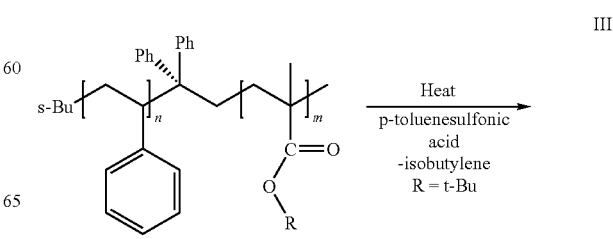

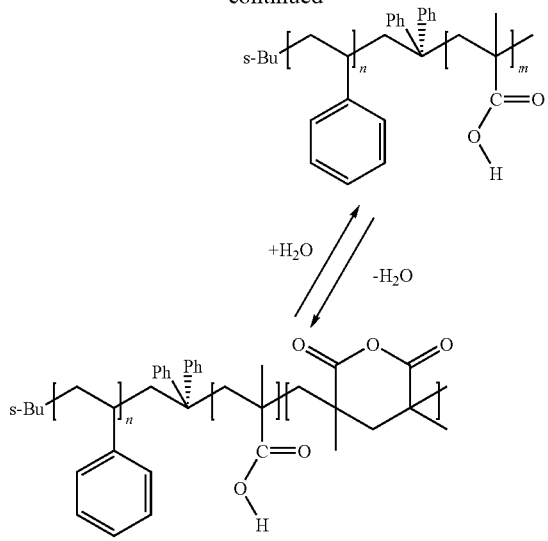

Appropriate (meth)acrylic ester-containing polymers include homopolymers, block copolymers, random copolymers, graft copolymers, starbranched and hyperbranched polymers. Specific examples include, but are not limited to, polymers containing t-butyl methacrylate, t-butyl crotonate, t-butyl acrylate, t-pentyl acrylate, 1,1-dimethylethyl-α-propylacrylate, 1-methyl-1-ethylpropyl-α-butylacrylate, 1,1-dimethylbutyl-α-phenylacrylate, t-hexyl acrylate, t-octyl methacrylate, isopropyl methacrylate, cyclohexyl methacrylate, and t-pentyl methacrylate. The preferred systems include t-butyl acrylate and t-butyl methacrylate.

The reaction may also be carried out on block copolymers containing methacrylic or acrylic block segments. Block copolymers containing poly(methacrylic acid)(PMAA), poly(acrylic acid)(PAA), poly(methacrylic anhydride) and poly(acrylic anhydride) block segments are typically difficult to introduce into a polymeric material, particularly in block copolymer systems synthesized by anionic routes, due to the inability of methacrylic/acrylic acid or methacrylic/acrylic anhydride to participate in anionic polymerizations. The present invention makes it easier to introduce these groups because they are in a protected form, which is amenable to conventional living polymerization techniques. These protecting groups are readily removed using the procedures described in this invention, resulting in a useful strategy to introduce these reactive functional groups into a polymeric backbone.

Polymeric materials containing t-butyl methacrylate groups are attractive reagents for this acid-catalyzed pyrolysis reaction because the t-butyl groups can be easily removed to produce methacrylic acid (PMAA) and methacrylic anhydride (PMAn) moieties, which may impart water solubility or provide reactive functionality to polymer systems.

Suitable acids for the above modification or deesterification include the aromatic sulfonic acids, methanesulfonic, ethanesulfonic, 2-propanesulfonic, benzenesulfonic, trifluoromethanesulfonic, and preferably, toluenesulfonic acid.

In addition to the catalytic acid modification, the methacrylate ester functionality may also be modified by the use of an alkali metal superperoxide such as potassium superperoxide in a suitable solvent such as a mixture of dimethyl sulfoxide and tetrahydrofuran. This technique has been taught for example by R. D. Allen, et al., *Coulombic Interactions in Macromolecular Systems, A.C.S. Symposium Series*, #302, pg. 79-92 (1986). The resulting modified product may be acidified with small amounts of an acid such as hydrogen chloride to improve solubility. Due to the difficulty in handling such reagents, the latter method is not preferred for commercial use.

In processes other than those of the present invention, typically, t-butyl methacrylate segments undergo thermally induced deesterification, under solventless conditions at temperatures above 200° C., or in solution, in the presence of trace acid for extended periods (8-12 hr) at 110° C. These known processes have several drawbacks such as: (1) in the bulk state, anhydride formation is hampered by the inefficient removal of by-products such as water, which can be trapped due to hydrogen bonding with the newly formed methacrylic acid segments; and (2) solution deesterification of (meth) acrylate materials often requires long reaction times, rendering any industrial solution process costly.

At least one aspect of the present invention overcomes these drawbacks because it allows for a lower temperature solvent-free reaction and it provides superior mixing and vacuum control, which help to drive the above equilibrium reaction to form materials with high anhydride levels.

In another aspect of this invention, polymeric materials containing styrenic-ester monomers can be modified by treatment with a base at above-ambient temperatures. Strong bases are known in the art. See, for example, Hawker et al., *Macromolecules*, 1998, 31, 1024. Examples include potassium t-butoxide and sodium t-butoxide and other alkyl metal oxide bases, amines, metal alkyls known in the art. In reactions of this sort, a molar equivalent of base is added to the reactor. Adding as little as ½ to 1 weight % of base will induce the desired reaction. The treatment with base at above-ambient temperature results in cleavage and the release of relatively volatile aliphatic reaction products and the formation of the desired hydroxyl functionalized polymers. For example the deesterification of esters produces hydroxyl functionalized species, e.g., the deesterification of poly(4-acetoxystyrene) yields poly(4-hydroxystyrene). Deesterification of esters can also lead to carboxylic functionalities, e.g., a poly (alkylbenzoate ester) can yield a poly(alkylbenzoic acid). Formula IV shows a base-catalyzed deesterification.

IV

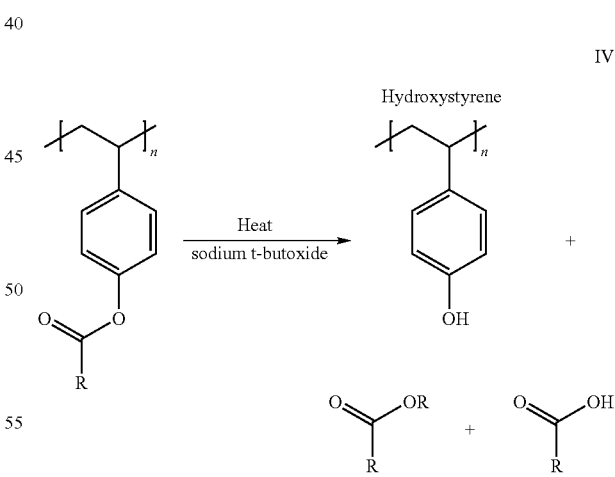

For Formula IV, appropriate starting polymers include those that contain, for example, para-, meta-, or ortho-acetoxystyrene. R may be any alkyl ester or aryl ester, preferably a primary alkyl ester.

Aspects of the present invention are also suitable to carry out deprotection reactions. Polymeric systems containing latent or protected functional groups can be synthesized, for example, in an extruder or stirred tube reactor, or by other known methods. The protecting groups are added to prevent the functional groups from reacting until the desired stage of a reaction process. The functional groups can be side groups or end groups. They can be, e.g., ethylenically or acetylenically unsaturated. After being incorporated into a polymer, these protected functional groups can undergo deprotection, to expose or produce functionalities at desired locations in the polymeric material. The functional groups will be in various locations in the backbone if included in a random polymer; will be in segments of the backbone if included in a block copolymer; and will be at the terminus of a polymer chain if included as a capping agent. An in situ formation of a block copolymer consisting of reaction of functionalized polymers and another polymer bearing acceptable terminal groups is also possible during reactive blending. Reaction of amines with anhydrides exhibit sufficiently fast kinetics in the melt state to provide technologically useful, compatibilized polymer blends.

Diene, methacrylate and styrenic homo and block copolymers end-functionalized with alcohol(s), thiol(s), and/or amine(s) may be synthesized anionically by the use of suitable anionic initiators which contain protected functional groups that can be removed by post polymerization techniques. Suitable functional initiators are known in the art and are described in, e.g., U.S. Pat. No. 6,197,891, U.S. Pat. No. 6,160,054, U.S. Pat. No. 6,221,991, and U.S. Pat. No. 6,184,338.

End-functionalized materials can also be synthesized by adding reagents that contain reactive halogen or unsaturated groups capable of quenching a "living" anionic polymerization as described above. Anionic polymerizations are not readily amenable to the polymerization of monomers containing relatively acidic, proton-donating groups such as amino, hydroxyl, thiol, carboxyl or acetylene functional groups. However, these groups can be included in the polymer via incorporation in functional quenching agents, i.e., a reactive moiety containing a protected functional group capable of quenching or terminating an anionically produced polymer chain, if protected by suitable protecting groups that are stable at the conditions of anionic polymerization and can be readily removed by post polymerization treatments. Suitable functional quenching agents include 1,3-bis(trimethylsilyl)carbodiimmide, and 1-(3-bromopropyl)-2,2,5,5-tetramethyl-1-aza-2,5-disilacyclopentane.

Block copolymers containing hydroxyl, amino, or thiol functionalities are difficult to introduce into a polymeric material, particularly in systems synthesized by anionic routes, due to the inability of compounds such as hydroxyethyl methacrylate, 4-vinylphenylethyl amines, or 4-vinylphenyl thiol to participate in anionic polymerizations. A popular route to these block copolymers involves the polymerization of (meth)acrylic- or styrenic-based monomers having protected functional groups. After polymerization, a deprotection reaction is carried out to produce hydroxyl, amine, and thiol functionalities. This method is an attractive approach to imparting water solubility or providing reactive functionality to polymer systems.

Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80-83.

A number of trialkylsilane deprotection reactions are also suitable for the present invention. These reactions include acid and fluoride anion deprotection reactions that remove the protecting trialkylsilane groups from terminal- or side-chain-functionalized polymers, such as trialkylsilthiane end- or side-group containing polymers. For example, trialkylsilanes can then be removed by treatment of the polymer with acid, such as hydrochloric acid, acetic acid, para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection. Hydroxyl end- or side-group functionalized polymers, such as that shown in Formula V, can be readily accessed by anionic polymerization of styrene derivatives such as 4-(t-butyldimethylsilyloxy)styrene, 5- or 4-vinyl-1,3-benzodioxoles and 4-vinylphenyl ethanol protected with t-butyldimethylsilyl or trimethylsilyl groups. Methacrylic hydroxyl-containing species can be accessed by polymerization of 2-hydroxyethyl methacrylate protected with a trimethylsilyl group or 2,3-dihydroxypropyl methacrylate masked with a dioxolane ring. The trimethylsilyl group or dioxolane ring can then be removed.

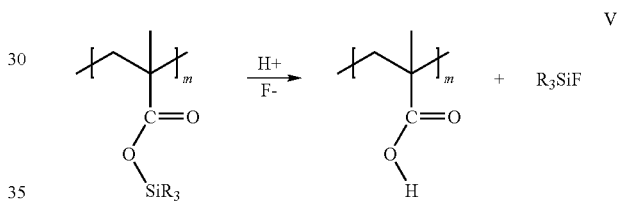

V

Thiol end- or side-group functionalized polymers can be obtained by the polymerization of 4-vinylphenyl thiol and 4-vinylphenylethyl thiol protected with a t-butyldimethylsilyl group. The t-butyldimethylsilyl group can then be removed.

Amino end- or side-group functionalized polymers can be obtained by the polymerization of styrenic monomers derived from 4-vinylphenyl, 4-vinylphenylmethyl, and 4-vinylphenylethyl amines protected with two trimethylsilyl groups. The trimethylsilyl groups can then be removed.

Formyl (aldehyde) end- or side-group functionalized polymers can be obtained by polymerizing styrenic systems derived from dioxolane-functionalized benzaldehyde, and N-[(4-vinylphenyl)methylene]-cyclohexamine. 3,4-Acyl substituted styrenes can be incorporated by silyl enol ether routes such as the t-butyldimethylsilyl protected enol ethers of vinylacetophenones. The t-butyldimethylsilyl groups can then be removed.

Carboxy end- or side-group functionalized polymers can be obtained by polymerizing 4-vinyl benzoic acid, protected with oxazoline, ester, or amido functionalities such as in N-(4-vinylbenzoyl)-N'methylpiperazine and t-butyl 4-vinylbenzoate. Methacrylate based trimethylsilyl methacrylate can also be employed. The oxazoline, ester, or amido functionalities can then be removed by treatment with acid.

Ethynyl (acetylene) side-group or end-functionalized polymers can be obtained. For example, ethynyl can be introduced as part of a polymer's side chain structure through anionic polymerization of 2-, 3- and 4-[(trimethylsilyl)-ethynyl]styrenes. The trimethylsilane group(s) can then be removed.

Grafting

After materials have been deprotected such that a functional group is exposed, subsequent reactions can be carried out immediately in the apparatus of the invention. These subsequent reactions can include grafting substituents onto the polymer backbone. Various grafting reactions may be carried out. Typically, these reactions could happen at room temp but occur faster at higher temperatures.

The polymeric materials produced by acid-catalyzed pyrolysis of methacrylic and acrylic esters are methacrylic/acrylic acid or methacrylic/acrylic anhydride functionalized polymers. These acid- and anhydride-functionalized polymers may participate in further grafting reactions including esterification, amidation, and imidization reactions.

In the case of esterification, the acid- or anhydride-functionalized polymeric material is subjected to reaction with small molecule nucleophiles, most preferably alcohols. Suitable alcohols that participate in this reaction consist of, but are not limited to $C_1$ to $C_{20}$, that can contain one or a combination of alkyl, alkenyl, or alkynyl moieties, and which can be straight, branched, or cyclic, or a combination thereof. A lower aliphatic group is typically from $C_1$ to $C_5$. The term alkyl, as used herein, unless otherwise specified, refers to a saturated straight, branched, or cyclic, primary, secondary, or tertiary hydrocarbon, preferably of $C_1$ to $C_{20}$. Mixtures of the foregoing aliphatic alcohols may also be employed. The preferred aryloxy groups (substituted or unsubstituted) may be derived from aromatic alcohols including among others phenol; alkylphenols such as cresols, xylenols, p-, o-, and m-ethyl and propyl phenols and the like; halogen-substituted phenols such as p-, o-, and m-chloro and bromo phenols and di- or tri-halogen substituted phenols and the like; and alkoxy-substituted phenols such as 4-methoxyphenol, 4-(n-butoxy) phenol and the like. Mixtures of the foregoing aromatic alcohols may also be employed.

In the case of amidation or imidization, the acid- or anhydride-functionalized polymeric material is subjected to reaction with amine nucleophiles. Suitable amines that participate in this reaction consist of, but are not limited to, typically primary alkyl, aryl, and alkylaryl-amines. The primary amines formula is $RNH_2$ wherein R stands for an alkyl group having 1 to 10 carbon atoms, a cycloalkyl group having 5 to 12 carbon atoms, an aralkyl group having 7 to 22 carbon atoms or an aryl group having 6 to 12 carbon atoms.

In addition to small molecule nucleophiles, polymeric nucleophiles can be used to add functionality to polymer systems via grafting reactions. For example, hydroxyl-terminated poly(lactide), poly(caprolactone), poly(dimethylsiloxane), and polyethylene glycol can be synthesized by employing a protected alcohol as part of the catalyst system, as known in the art. Amine terminated poly(lactide), poly(caprolactone), poly(dimethylsiloxane), polyethylene glycol, can be synthesized by employing a protected alcohol as part of the catalyst system, as known in the art. Amine and alcohol terminated polymers can be purchased from Aldrich (Milwaukee, Wis.), Tomah (Tomah, Wis.), Shearwater Polymers (Huntsville, Ala.), and Gelest (Morrisville, Pa.).

Diene, methacrylate and styrenic homo and block copolymers end-functionalized with alcohol(s), thiol(s), and/or amine(s) may be synthesized anionically by the use of suitable anionic initiators, which contain protected functional groups that can be removed by post polymerization techniques. Suitable anionic initiators are known in the art and are described in, e.g., U.S. Pat. No. 6,197,891, U.S. Pat. No. 6,160,054, U.S. Pat. No. 6,221,991, and U.S. Pat. No. 6,184,338.

EXAMPLES

Test Methods

Molecular Weight and Polydispersity

The average molecular weight and polydispersity of a sample was determined by Gel Permeation Chromatography (GPC) analysis. Approximately 25 mg of a sample were dissolved in 10 milliliters (mL) of tetrahydrofuran (THF) to form a mixture. The mixture was filtered using a 0.2 micron polytetrafluoroethylene (PTFE) syringe filter. Then about 150 microliters (µL) of the filtered solution were injected into a Plgel-Mixed B column (available from PolymerLabs, Amherst, Mass.) that was part of a GPC system also having a Waters 717 Autosampler and a Waters 590 Pump (Waters Corporation, Milford, Mass.). The system operated at room temperature, with a THF eluent that moved at a flow rate of approximately 0.95 mL/min. An Erma ERC-7525A Refractive Index Detector (JM Science, Grand Island, N.Y.) was used to detect changes in concentration. Number average molecular weight ($M_n$) and polydispersity index (PDI) calculations were based on a calibration mode that used narrow polydispersity polystyrene controls ranging in molecular weight from $6\times10^6$ to $600\times10^6$. The actual calculations were made with Caliber software (available from Polymer Labs, Amherst, Mass.).

Infared Spectroscopy

Samples were run by two methods: either by slicing small slivers of the sample with a scalpel and examining them on an IRµS Spectra-Tech Fourier Transform Infrared Microscope (available from Thermo Spectra-Tech, Shelton, Conn.) used in transmission mode or as small slivers melt smeared onto CsBr or KBr crystals and run by transmission on a Bomem MB-100 Fourier Transform Infrared Spectrometer (available from ABB Bomen, Quebec City, Canada).

NMR Spectroscopy

The concentration of each block and confirmation of elimination or rearrangement was determined by Nuclear Magnetic Resonance (NMR) spectroscopy analysis. A sample was dissolved in deuterated chloroform to a concentration of about 10 wt % and placed in a Unity 500 MHz NMR Spectrometer (available from Varian, Palo Alto, Calif.). Block concentrations were calculated from relative areas of characteristic block component spectra. All spectra were with H1 NMR unless otherwise indicated.

Diffusion Ordered Spectroscopy

NMR diffusion experiments were performed on a Varian INOVA 500 MHz NMR spectrometer (Varian, Palo Alto, Calif.) using a NALORAC 5 mm dual broadband gradient probe. The samples were submitted for diffusion analysis via DOSY (diffusion ordered spectroscopy) to determine if copolymerization and/or hydrolysis of t-butyl groups has occurred. A DOSY Bipolar Pulse Pair Stimulated Echo pulse sequence was used in this experiment, to permit separation of NMR signals in a mixture based on the diffusion coefficients. The gradient was applied to the sample for 50 msec before acquisition of the spectrum.

UV-Visible Spectroscopy

Spectra were run between a wavelength of 100 and 900 $cm^{-1}$ with a Lambda 4B UV Vis Spectrophotometer (available from Perkin Elmer, Shelton, Conn.). Polymeric material, in the amount of from 1-3 mg, was dissolved in 10 mL of dichloromethane. The resulting solution was placed in the spectrophotometer and an analysis was made.

Starting Polymeric Materials

Poly(isoprene-t-butyl methacrylate), (PI-t-BMA), poly(styrene-t-butyl methacrylate)(PS-t-BMA), poly(styrene-isoprene-t-butyl methacrylate)(PS-PI-t-BMA), and PFI2-endfunctionalized polystyrene ((t-butyldimethylsiloxy)propyl terminated polystyrene)(PFI-2-PS), were synthesized by living anionic polymerizations in a stirred, temperature controlled tubular reactor as described in WO0158962, "Continuous Process for the Production of Controlled Architecture Materials". PFI2-end functionalized polystyrene ((t-butyldimethylsiloxy)propyl terminated polystyrene)(PFI-2-PS) was synthesized by living anionic polymerizations in a stirred, temperature-controlled tubular reactor as described in WO0158962, "Continuous Process for the Production of Controlled Architecture Materials" by the replacement of sec-butyl lithium with PFI-2 in cyclohexane, available as 3-(t-butyldimethylsilyloxy)-1-propyllithium from FMC-Lithium, Gastonia, N.C. Poly(styrene-vinylphenyl sulfoxide) was synthesized by batch solution anionic polymerization as described by Leung et al. (*Polymer* 35, 1994, 1556). Poly(iso-octyl acrylate co-p-acetoxystyrene) and poly(iso-octyl acrylate-co-trimethylsilyl acrylate) were synthesized under batch, solution conditions in xylene, by treatment of the monomer mixture with t-butyl peroxybenzoate (Aldrich) as the thermal initiator (2.5 wt % relative to monomer). Both poly(iso-octyl acrylate co-p-acetoxystyrene) and poly(iso-octyl acrylate-co-trimethylsilyl acrylate) were 50% solids in o-xylene at a polymerization temperature of 120° C.

| Materials Used | |
|---|---|
| Materials | Description |
| Toluene | Available from Worum Chemical, St. Paul, Minnesota. |
| IRGANOX 1076 | Octadecyl 3,5-di-tert-butyl-4 hydroxyhydrocinnamate available from Ciba Specialty Chemicals Corp. Tarrytown, New York. |
| p-Toluenesulfonic acid monohydrate | Available from Aldrich Chemical Co., Milwaukee, Wisconsin. |
| THF | Tetrahydrofuran, available from ISP Technologies, Wayne, New York. |
| Butylamine | Available from Aldrich Chemical Co. |
| Octylamine | Available from Aldrich Chemical Co. |
| Cyclohexylamine | Available from Aldrich Chemical Co. |
| 3-(Dimethylamino)-propylamine | Available from Aldrich Chemical Co. |
| Cyclohexane | Available from Worum Chemical. |
| Isoprene | Available from Aldrich Chemical Co. |
| Styrene | Available from Ashland Chemical, Columbus, Ohio. |
| t-Butyl methacrylate | Available from Sans Esters Corp., New York, New York. |
| Diphenylethylene | Available from Acros/Fisher Scientific, Itasca, Illinois. |
| sec-Butyl lithium | An anionic initiator, 1.3 Molar in cyclohexane, available from Aldrich Chemical Co. |
| Vinyl phenyl sulfoxide | Available from Aldrich Chemical Co. |
| PFI-2 in cyclohexane | Available as 3-(t-butyldimethylsilyloxy)-1-propyllithium (PFI-2-PS) from FMC-Lithium, Gastonia, NC. |
| Trimethylsilyl methacrylate | Available from Aldrich Chemical Co. |
| 4-Acetoxystyrene | Available from Aldrich Chemical Co. |
| Ethanolamine | Available from Aldrich Chemical Co. |
| Poly(ethylene glycol) methyl ether | Available at Mn 350 from Aldrich Chemical Co. |
| Iso-octyl acrylate | Available from 3M Corporation, St. Paul, Minnesota. |
| 2-(N-methylperfluoro butanesulfonamido)ethyl methacrylate | Available from Available from 3M Corporation, St. Paul, Minnesota. |

Continuous Vacuum Reactor

Continuous synthesis reactions were performed in a high viscosity devolatilizer reactor (LIST Discotherm B6 High Viscosity Processor, available from List AG, Acton, Mass.). The reactor consisted of a horizontal, cylindrical housing, comprising 3 zones. Located in the center of the housing was a concentric main screw agitator shaft. Mounted on the shaft (and extending perpendicular to the shaft) were disk elements that had angled peripheral mixing-kneading bars (extending generally parallel to the shaft). Stationary hook-shaped bars mounted on the inside of the housing interacted with and cleaned the shaft and disk elements as they rotated. The arrangement of the disk elements and mixing-kneading bars in concert with the stationary hook-shaped bars imparted a substantially forward plug-flow movement to the material with minimal axial intermixing. (The plug flow nature of the reactor was quantified by using a dough-like product injected with a tracer to obtain a residence time distribution curve. The curve was plotted against a theoretical curve for 14 ideal continuous stirred tank reactors in series. The data fit the theoretical curve well, indicating plug-flow behavior.) Material was discharged from the LIST by a twin-screw discharge screw.

The total volume in the reactor was 17.5 L, with a working volume of 12 L. The housing, shaft, and disk elements were all heated via a hot oil heating system. The heat transfer area in the reactor was 0.67 $m^2$. Temperature was controlled and monitored in three locations within the reactor: (1) the reactor entrance zone (temperature Ti), (2) the reactor intermediate zone (temperature T2) and (3) the reactor exit zone (temperature T3). A variable speed motor drove the agitator shaft at speeds of 5 to 70 rpm and a maximum torque of 885 ft lbs (1200 Nm). A vacuum pump was attached to the reactor for vapor removal. The condensate was collected in two evacuated, high vacuum glass solvent traps, which were submersed in a slurry bath consisting of a suitable coolant, typically ISOPAR((isoparaffin hydrocarbons $C_{18-25}$) available from Exxon Company USA, Houston, Tex.) and dry ice ($CO_2$).

Batch Vacuum Reactor

Batch synthesis reactions were performed in a high performance measuring kneader, the MKD 0,6-H60 IKAVISC Measuring Kneader (available from IKA Labortechnik, Janke & Kunkel Gmbh & Co. KG, Germany). The kneader consisted of a kneading trough that held 600 ml and had a working volume of 300 ml. The bottom of the trough was double walled allowing the batch to be heated via a hot oil circulator. Kneading was accomplished with two kneading paddles, which were fixed to the motor, that mix the polymeric materials both horizontally and vertically. The paddles continually wiped the walls and each other. In the lid was a port from which a vacuum could be established and liquid could be introduced.

The speed of the kneader paddles was controlled with an RE 162/P Analog Controller (available from IKA Labortechnik). The speed of the paddles could range from 0.5 to 64 rpm. Torque was measured with a Vise MS Torque Meter (available from IKA Labortechnik). Temperature was measured from within a paddle with an Ikatron DTM11 thermometer, (available from IKA Labortechnik). Vacuum was measured digitally with a 375 Convection Vacuum Meter (available from Greenville Phillips, Boulder, Colo.). A DC motor with a constant power output of 160 W was mounted downstream from a gear assembly that was capable of transmitting a torque of 60 Nm to drive the paddles. The kneader was heated by an EXOCAL EX-250 HT High Temperature Bath equipped with a High Temperature Bath Controller/Readout having a temperature range of 40° C. to 250° C. (both available from Neslab, Portsmouth, N.H.). A heat transfer fluid (a $C_{11}$ to $C_{25}$ petroleum hydrocarbon, available as STEFRIFLUSH, from Petro-Canada, Calgary Alberta, Canada) was used in the bath. Vacuum was supplied, for vapor removal, via a double stage rotary vacuum pump (Model RV5 vacuum pump with a 4.1 cfm (117L/min) displacement, ultimate vacuum (without gas ballast) of $1.5 \times 10^{-3}$ torr (200 mPa), maximum inlet pressure for water vapor of 38 torr (5.1 kPa), and a ½ hp (0.373 kW) motor, available from Boc Edwards, Wilmington, Mass.). Condensate was collected in two evacuated, high vacuum glass solvent traps, which were submersed in Dewars flasks containing liquid nitrogen.

Example 1

Batch Synthesis of poly(isoprene-methacrylic acid/anhydride) via the p-toluenesulfonic Acid Catalyzed Modification of poly(isoprene-t-butyl methacrylate) and Subsequent Transesterification with poly(ethylene glycol) Methyl Ether This example illustrates that this invention may be used to modify temperature sensitive polymer systems, such as polyisoprene, which undergo crosslinking reactions upon extended exposure to high temperatures (>100° C.). Additionally, this example shows the ability to perform grafting reactions from the acid and anhydride materials formed in-situ.

A solution of poly(isoprene-t-butyl methacrylate)(PI-t-BMA) in toluene, 250 grams at a concentration of 60 wt % solids, was siphoned into the batch vacuum reactor set at 100° C. and agitated at a speed of 68 rpm to create a torque of 11 Nm. A vacuum of about 1170 Pa (8.8 torr) was applied for 30 minutes to evaporate the solvent. The temperature of the reactor was increased to 106° C., a solution of p-toluenesulfonic acid monohydrate in THF, 20 g at 13 wt % solids, was siphoned into the reactor, and the internal vacuum of the reactor was re-established at about 1170 Pa. After 30 minutes, the color of the modified starting material, PI-t-BMA, had changed from white to light yellow, and the measured torque had increased to 13 Nm. Then 12.2 g of the nucleophile poly(ethylene glycol) methyl ether (PEGME) was siphoned into the reactor as a neat liquid and the internal vacuum of the reactor was re-established to 1200 Pa (9.0 torr). The contents were removed after 15 minutes.

Samples were tested with Infrared Spectroscopy, NMR Spectroscopy and Diffusion Ordered Spectroscopy. Results from Infrared Spectroscopy confirmed that modification had occurred. The spectra illustrated IR resonances indicative of the formation of anhydride functionalities (1801 and 1760 $cm^{-1}$), an ester carbonyl, indicating the presence of a methacrylate moiety (1734 $cm^{-1}$), and an acid functionality (the shoulder peak at 1709 $cm^{-1}$). Results of NMR Spectroscopy confirmed the loss of t-butyl methacrylate groups and the presence of grafting of PEGME. The results for Example 1 are depicted in Table 1 following Example 4. Results of Diffusion Ordered Spectroscopy revealed that the PEGME had grafted and that the reaction mixture consisted of a mixture of hydrolyzed PI-t-BMA and the copolymer with PEGME grafted thereon.

Example 2

Batch Synthesis of poly(styrene-methacrylic acid/anhydride) via the p-toluenesulfonic Acid Catalyzed Modification of poly(styrene-t-butyl methacrylate) and Subsequent Grafting with Amines This example illustrates that this invention may be used to graft mixtures of nucleophiles onto acid and anhydride functionalities formed in-situ.

A solution of poly(styrene-t-butyl methacrylate)(PS-t-BMA) in cyclohexane, 300 g at a solids concentration of 40 wt %, followed by a solution of Irganox 1076 in THF, 24 g at a solids concentration of 17 wt %, were siphoned into the batch vacuum reactor set to a temperature of about 100° C. The solutions were mixed at a speed of 68 rpm under a torque of 30 Nm. Solvents were evaporated from the reaction mixture by applying a vacuum of about 667 Pa (5.0 torr) to the reactor and agitating the mixture for 30 minutes. The batch temperature of the reactor was increased to 140° C. at which point, 4 g p-toluenesulfonic acid monohydrate was added into the reactor and the internal vacuum of the reactor was re-established to about 667 Pa. After mixing for an additional 15 minutes, the color of the modified starting PS-t-BMA material had changed from white to dark brown. The reaction mixture was sampled at this point.

The intermediate sample was tested with Infrared Spectroscopy. The resulting spectra depicted characteristic IR spectra indicative of the formation of anhydride (IR bands at 1801 and a shoulder peak at 1760 $cm^{-1}$), an ester carbonyl indicating the presence of a methacrylate moiety (the 1734 $cm^{-1}$ band) and an acid functionality (a band at 1709 $cm^{-1}$).

Octylamine, in an amount of 5 g, was siphoned into the reaction mixture and the internal vacuum of the reactor was re-established to about 667 Pa. Butyl amine, in an amount of 15 g, was siphoned into the reactor after about 5 minutes and the internal vacuum of the reactor was re-established to about 667 Pa. The contents were removed after 5 minutes.

The final sample was tested with Infrared Spectroscopy, NMR Spectroscopy, and Diffusion Ordered Spectroscopy. Results from Infrared Spectroscopy confirmed that modification and the formation of anhydride, acid, and grafted amide occurred. The spectra illustrated IR resonances indicative of the formation of methacrylic anhydride (IR bands at 1801 and a shoulder peak at 1760 $cm^{-1}$), ester (1734 $cm^{-1}$), acid (1709 $cm^{-1}$), and amide (1644 $cm^{-1}$). Results of NMR Spectroscopy confirmed the loss of t-butyl methacrylate groups. The results for Example 2 are depicted in Table 1 following Example 4. Results from Diffusion Ordered Spectroscopy confirmed the loss of the t-butyl group from the copolymer.

Example 3

Batch Synthesis of poly(isoprene-methacrylic acid) via the p-toluenesulfonic Acid Catalyzed Modification of poly(isoprene-t-butyl methacrylate)

This example illustrates that i) this invention may be used to modify temperature sensitive polymer systems, such as polyisoprene, which undergo crosslinking reactions upon extended exposure to high temperatures (>100° C.) and ii) by controlling reaction time in the reactor, acid functionality can be preferentially produced at short reaction times.

A solution of poly(isoprene-t-butyl methacrylate)(PI-t-BMA) in toluene, 365 g at a solids concentration of 60 wt %, was siphoned into the batch vacuum reactor set at a temperature of 100° C. and agitated at a speed of 68 rpm with a torque of 16 Nm. The solvent was evaporated from the solution by applying a vacuum of about 467 Pa (3.5 torr) to the reactor and agitating the solution for about 20 minutes. The temperature of the reactor was increased to 111° C., p-toluenesulfonic acid monohydrate in the amount of 1.5 g was added into the reactor and the internal vacuum of the reactor was re-established to about 467 Pa. After 10 minutes, the color of the modified starting PI-t-BMA material had changed from white to light yellow, and the torque, measured with a torque meter, had increased to 17 Nm, indicating a viscosity increase.

The reaction product was tested with Infrared Spectroscopy and NMR Spectroscopy. Results of Infrared Spectroscopy confirmed that modification had occurred and that acid was formed. The spectra illustrated IR resonances indicative of the presence of methacrylic acid (1712 cm$^{-1}$ associated with an acid functionality). Results of NMR Spectroscopy confirmed the loss of t-butyl methacrylate groups. The results for Example 3 are depicted in Table 1 following Example 4.

Example 4

Batch Synthesis of
poly(styrene-isoprene-methacrylic acid/anhydride)
via the p-toluenesulfonic Acid Catalyzed
Modification of poly(styrene-isoprene-t-butyl
methacrylate) and Subsequent Grafting with Amines This example illustrates a reaction with another class of polymers, that of an ABC triblock copolymer.

A solution of poly(styrene-isoprene-t-butyl methacrylate) (P(S-1-t-BMA)) in cyclohexane, 337 g at a solids concentration of 40 wt %, was siphoned into the batch vacuum reactor set at 100° C. and mixed at a speed of 68 rpm with a torque of 13 Nm. The solvent was evaporated from the solution by applying a vacuum to the reactor at 467 Pa (3.5 torr) over the next 30 minutes. The temperature of the reactor was increased to 133° C. and both 1 g of Irganox 1076 and 1.5 g of p-toluenesulfonic acid monohydrate were added into the reactor. The internal vacuum of the reactor was re-established to about 467 Pa. After 10 minutes, the color of the modified starting P(S-1-t-BMA) material had changed from white to light yellow. The reaction mixture was sampled.

The sample was tested with Infrared Spectroscopy and NMR Spectroscopy. Results of Infrared Spectroscopy revealed the presence of resonances attributable to anhydride and acid. The spectra depicted IR bands at 1802 and 1760 cm$^{-1}$ which are associated with an anhydride, a band at 1734 cm$^{-1}$ associated with an ester carbonyl, indicating the presence of a methacrylate moiety, and a shoulder peak at 1706 cm$^{-1}$ associated with an acid functionality. Results of NMR Spectroscopy confirmed the loss of t-butyl methacrylate groups. The results for Example 4 are depicted in Table 1 together with those of Example 1-3.

Example 5

Batch Synthesis of poly(styrene-acetylene) Block
Copolymers via the Thermal Modification of
poly(styrene-vinyl phenyl sulfoxide)

This example illustrates the thermal elimination of benzenesulfenic acid from poly(styrene-vinyl phenyl sulfoxide)(P(S-VPS)) to produce a poly(styrene-acetylene) block copolymer.

A solution of (P(S-VPS)) in toluene, 200 g at a solids concentration of 57 wt %, was siphoned into the batch vacuum reactor set to 100° C. and mixed at a speed of 68 RPM with a torque of 16 Nm. The solvent was evaporated from the solution by applying a vacuum of about 400 Pa (3.0 torr) to the reactor over the next 30 minutes. After 30 minutes, the color of the modified starting P(S-VPS) material had changed from light yellow to burgundy red. The reaction mixture was sampled and the contents of the reactor were removed.

The sample was tested with NMR Spectroscopy and UV-Visible Spectroscopy. The results of NMR Spectroscopy confirmed the loss of benzenesulfenic acid. The results of UV-Visible Spectroscopy confirmed the presence of resonances attributable to polyacetylene chromophores (bands between 375 and 500 nm).

Example 6

Deprotection of PFI-2-End-Functionalized Polystyrene ((t-butyldimethylsiloxy)propyl Terminated
Polystyrene)(PFI-2-PS)

This example illustrates deprotection reactions resulting in the formation of reactive, end-functional materials.

A mixture of a solution of PFI-2-PS in cyclohexane, 364 g at a solids concentration of 40 wt %, and 1 g of Irganox 1076 was siphoned into the batch vacuum reactor set at 100° C. and agitated at a speed of 68 rpm with a torque of 24 Nm. The solvent was evaporated from the solution by applying a vacuum at 3.3 kPa (25 torr) to the reactor for 30 minutes. The temperature of the reactor was increased to 122° C., 1.5 g of p-toluenesulfonic acid monohydrate was added, and the internal vacuum of the reactor was re-established to about 3.3 kPa. After 30 minutes, the color of the modified starting PFI-2-PS material had changed from white to light brown. The reaction mixture was sampled after 30 minutes and the contents of the reactor were removed.

Samples were tested with NMR Spectroscopy and Diffusion Ordered Spectroscopy. Results form NMR Spectroscopy confirmed the loss of t-butyl(dimethyl)silyl (t-BuSi) groups associated with the PFI-2 end group. Results from Diffusion Ordered Spectroscopy showed that no polymeric PFI-2-functionalized polystyrene was present, but that free t-Bu(Me)$_2$Si groups and polystyrene were present. This indicates that all of

TABLE 1

| Example | Starting Material | t-BMA mole % before | t-BMA mole % after | Temp. ° C. | Nucleophile | Graft Time (min) |
| --- | --- | --- | --- | --- | --- | --- |
| 1 | PI-t-BMA | 30.9 | 7.1 | 106 | poly(ethylene glycol) methyl ether (PEGME) | 15 |
| 2 | PS-t-BMA | 24 | 1.0 | 132 | octylamine | 30 |
| 3 | PI-t-BMA | 30.9 | 1.7 | 130 | none | na |
| 4 | PS-PI-t-BMA | 23.5 | 2.0 | 133 | none | na | the protecting groups were removed, but not all were devolatilized. Quantitative results (in mole % and wt %) are shown in Table 2.

TABLE 2

| Example | Free t-Bu(Me)$_2$Si mole % | poly t-Bu(Me)$_2$Si mole % | PS mole % |
|---|---|---|---|
| 6 | 0.1 | 0.0 | 99.9 |

Example 7

Batch Synthesis of poly(iso-octyl acrylate-co-p-hydroxystyrene) via Base Catalyzed Modification of poly(iso-octyl acrylate-co-p-acetoxystyrene)

This example illustrates the production of functional styrenic materials, via the base catalyzed hydrolysis of the random copolymer of poly(iso-octyl acrylate-co-p -hydroxystyrene), which serves as a precursor to poly(p-hydroxystyrene) segments.

A mixture of a solution of poly(iso-octyl acrylate-co-p-acetoxystyrene) in xylene, 360 g at a solids concentration of 50 wt %, and 1 g of Irganox 1076, was siphoned into the batch vacuum reactor set at 120° C. and agitated at a speed of 68 rpm with a torque of 24 Nm. The solvent was evaporated from the solution by increasing the temperature to 140° C. and applying a vacuum of 3.3 kPa (25 torr) to the reactor for 40 minutes. Sodium t-butoxide (NaOt-Bu) in an amount of 1.5 g was added and the internal vacuum of the reactor was re-established to 3.3 kPa. After 30 minutes, the color of the modified starting polymeric material had changed from white to light brown and the reaction mixture was sampled. Similar sampling was performed 30 minutes after the temperature had been raised to 150° C. and again 30 minutes after the temperature had been raised to 160° C.

Each sample was tested with NMR Spectroscopy. Results confirm a loss of acetic acid and a diminished mole % of acetoxystyrene. Quantitative results are shown in Table 3.

TABLE 3

| Sample | Description | P(IOA) | P(acetoxystyrene) |
|---|---|---|---|
| 7A | P(IOA/4-acetoxystyrene) Starting Material | 53.3% | 46.4% |
| 7B | P(IOA/4-acetoxystyrene) + NaOt-Bu at 140° C. | 97.8% | 2.2% |
| 7C | P(IOA/4-acetoxystyrene) + NaOt-Bu at 150° C. | 98.7% | 1.3% |
| 7D | P(IOA/4-acetoxystyrene) + NaOt-Bu at 160° C. | 98.7% | 1.3% |

Example 8

Batch Synthesis of poly(iso-octyl acrylate-co-trimethylsilyl methacrylate) via the Acid Catalyzed Modification of poly(iso-octyl acrylate-co-trimethylsilyl Methacrylate)

This example illustrates the production of side-chain acid-functional materials, via the acid catalyzed modification of the random copolymer of poly(iso-octyl acrylate-co -trimethylsilyl methacrylate).

A mixture of a solution of poly(iso-octyl acrylate-co-trimethylsilyl methacrylate) in xylene, 360 g at a solids concentration of 50 wt %, and 1 g of Irganox 1076, was siphoned into the batch vacuum reactor set at 120° C. and agitated at a speed of 68 rpm with a torque of 24 Nm. The temperature was increased to 140° C. and the solvent was removed by applying a vacuum of 2.2 kPa (25 torr) to the reactor for 40 minutes. P-toluenesulfonic acid monohydrate in an amount of 1.5 g was added into the reactor and the internal vacuum of the reactor was re-established to 3.3 kPa. After 30 minutes, the color of the modified starting polymeric material had changed from white to light brown and the reaction mixture was sampled. The temperature was raised to 150° C. and another sample was taken after an additional 30 minutes had elapsed.

Samples were tested with Infrared Spectroscopy and NMR Spectroscopy. Results of Infrared Spectroscopy revealed the presence of bands at 1707 cm$^{-1}$ corresponding to carboxylic acid groups. Results of NMR Spectroscopy confirmed the presence of methacrylic acid. Quantitative results are given in Table 4.

TABLE 4

| Example | Description | P(methacrylic acid) mole % |
|---|---|---|
| 8A | Poly(iso-octyl acrylate-co-trimethylsilyl methacrylate) | 0.0% |
| 8B | Poly(iso-octyl acrylate-co-trimethylsilyl methacrylate) + PTSA at 140° C. | 9.3% |
| 8C | Poly(iso-octyl acrylate-co-trimethylsilyl methacrylate) + PTSA at 150° C. | 9.2% |

Example 9

Continuous Synthesis of poly(styrene-methacrylic acid/anhydride) via the p-toluenesulfonic Acid Catalyzed Modification of poly(styrene-t-butyl methacrylate)

This example illustrates a continuous, scaleable process that can be combined with other continuous reactor technology (in this case a temperature-controlled, stirred tubular reactor) and the lower temperatures that can be used for the modification reaction by employing a continuous operation.

A solution of PS-t-BMA in toluene was made in a stirred tubular reactor (STR) according to WO0158962, "Continuous Process for the Production of Controlled Architecture Materials", Example 6, at a solids concentration of about 37 wt %. The block copolymer composition varied in both number average molecular weight and polydispersity index as a function of time from start-up as shown in Table 5. This shows the initial t-butyl methacrylate levels.

A solution of p-toluenesulfonic acid monohydrate in toluene was prepared by mixing 463 g of p-toluenesulfonic acid monohydrate in 4169 g toluene. The p-toluenesulfonic acid monohydrate catalyst solution was pumped via peristaltic pump at a rate of 9.6 g/min into the last zone of the STR and mixed with the PS-t-BMA solution in a ratio of 0.0083 to 1.

TABLE 5

| Example | Time min | Styrene mole % | t-BMA mole % | $M_n$ ×10$^4$ | PDI |
|---|---|---|---|---|---|
| 9A | 0 | 92.8 | 7.2 | 2.59 | 2.43 |
| 9B | 13 | 80.3 | 19.7 | 3.26 | 2.48 |
| 9C | 60 | 76.7 | 23.3 | 3.12 | 2.68 |

The resultant solution was pumped (via a zenith pump at 19.7 rpm) from the STR to the first zone of the Continuous Vacuum Reactor. The speed of the main screw agitator shaft of the vacuum reactor was kept constant at approximately 34 rpm, while the discharge screw of the reactor was maintained at 47 rpm. The reactor was maintained at a vacuum of about 2.7 kPa (20 torr) and at temperatures of between 150-175° C.

The resulting material was tested with Infrared Spectroscopy and NMR Spectroscopy. Results of the Infrared Spectroscopy confirmed the presence of anhydride groups (1760 cm$^{-1}$). The reactor was sampled at various intervals. All of the samples showed the presence of anhydride. Quantitative results shown in Table 6 include a comparison of the area under an Infrared Spectroscopy spectra band at 1760 cm$^{-1}$ (from the anhydride) to the area under a spectra band at 1601 cm$^{-1}$ (an aromatic ring absorption) The aromatic absorption should remain constant as it is associated with the PS block. —This allows tracking of changes in the anhydride level. Time 0 indicates when the first sample was taken.

TABLE 6

| Example | Time min | PS mole % | Pt-BMA mole % | $M_n$ ×10$^4$ | PDI | Area 1601 cm$^{-1}$ | Area 1760 cm$^{-1}$ | Ratio of Areas 1760/1601 cm$^{-1}$ |
|---|---|---|---|---|---|---|---|---|
| 9D | 0 | 95.9 | 4.1 | 2.29 | 2.21 | 0.65 | 0.65 | 1 |
| 9E | 30 | 97.8 | 2.2 | 2.28 | 2.18 | 0.54 | 0.59 | 1.09 |
| 9F | 35 | 98.7 | 1.3 | 2.37 | 2.13 | 1.02 | 1.24 | 1.22 |
| 9G | 105 | 99.2 | 0.8 | 2.51 | 2.13 | 1.48 | 1.6 | 1.08 |
| 9H | 150 | 99.1 | 0.9 | 2.45 | 2.21 | 0.65 | 0.79 | 1.22 |

Results of NMR Spectroscopy revealed the revealed the significant reduction of the t-butyl groups, consistent with hydrolysis.

Example 10

Continuous Synthesis of poly(isoprene-methacrylic acid/anhydride) via the p-toluenesulfonic Acid Catalyzed Modification of poly(isoprene-t-butyl methacrylate)

This example illustrates a synthesis reaction using temperature sensitive materials that are susceptible to crosslinking at elevated temperatures, and the ability to control the acid to anhydride ratio by varying temperature in the Continuous Vacuum Reactor.

Example 10 was made in a manner similar to Example 9 except different materials were used and some conditions were changed. P-Toluenesulfonic acid monohydrate in the amount of 76 g was added to a solution of poly(isoprene-t-butyl methacrylate) in toluene (19 kg at solids concentration of 40 wt %) in a wt ratio of p-toluenesulfonic acid monohydrate to poly(isoprene-t-butyl methacrylate) solution of 1:100. The mixture was agitated with an air-powered stirrer operating at 100 rpm at room temperature for 20 minutes. The resultant solution was pumped (via a Zenith pump at 19.7 rpm) to the first zone of the continuous reactor. The temperature settings in the reactor were varied to explore the effect of temperature on extent of hydrolysis and crosslinking. Temperatures that were varied were (1) the reactor entrance zone temperature (T1), (2) the reactor intermediate zone temperature (T2) and (3) the reactor exit zone temperature (T3). Table 7 indicates the temperature settings and resulting vacuum readings.

Samples were tested continuously with Infrared Spectroscopy. The continuous process was stopped when crosslinking was observed. The continuous run was started again when the temperature decreased to a range at which crosslinking would not occur.

Results of Infrared Spectroscopy revealed the presence of characteristic bands at 1801 and 1758 cm$^{-1}$ associated with an anhydride, at 1709 cm$^{-1}$ associated with an acid functionality and at 1736 cm$^{-1}$ associated with an ester carbonyl as in a methacrylate moiety. The ratio of the anhydride to the acid and the ratio of the ester to the acid was calculated from areas under various bands of the infrared spectra. The ratios are also shown in Table 7.

TABLE 7

| Example | Time min | T1 °C. | T2 °C. | T3 °C. | Vacuum kPa (Torr) | Ratio of Anhydride:Acid | Ratio of Ester:Acid |
|---|---|---|---|---|---|---|---|
| 10A | 0 | 91 | 100 | 103 | 19.2 (144) | 0.08 | 0.73 |
| 10B | 10 | 91 | 100 | 110 | 19.2 (144) | 0.10 | 0.72 |
| 10C | 25 | 99 | 110 | 116 | 18.0 (135) | 0.16 | 0.75 |
| 10D | 32 | 104 | 112 | 124 | 17.6 (132) | 0.29 | 0.83 |
| 10E | 56 | 113 | 120 | 136 | 16.9 (127) | Crosslinked | Crosslinked |
| 10F | 295 | 88 | 100 | 113 | 16.0 (120) | 0.49 | 0.90 |
| 10G | 305 | 88 | 100 | 113 | 16.0 (120) | 0.30 | 0.91 |
| 10H | 315 | 88 | 100 | 113 | 16.0 (120) | 0.33 | 0.91 |
| 10I | 325 | 88 | 100 | 102 | 16.0 (120) | 0.14 | 0.75 |

Example 11

Batch Synthesis of poly(2-(N-methylperfluorobutanesulfonamido)ethyl methacrylate)-b-methacrylic anhydride/acid) via the p-toluenesulfonic acid Catalyzed Hydrolysis of Poly(2-(N-methylperfluorobutanesulfonamido) Ethyl Methacrylate-t-butyl Methacrylate)(P(MeFBSEMA-t-BMA))

This example illustrates hydrolyzing semifluorinated block copolymer systems, such as poly(2-(N-methylperfluorobutanesulfonamido) ethyl methacrylate-t-butyl methacrylate)(P(MeFBSEMA-t-BMA)).

Starting materials were prepared in the following manner:

Reactant monomers t-butyl methacrylate (t-BMA), MeFBSEMA (2-(N-methylperfluorobutanesulfonamido) ethyl methacrylate), and 1,1'diphenylethylene in cyclohexane were nitrogen sparged until the $O_2$ concentration was less than 1 part per million (ppm).

Reaction solvents (cyclohexane, THF) were pumped through molecular sieve beads (available as Zeolite 3A from UOP, Chickasaw, Ala.).

An initiator slurry was prepared by mixing 50 g of 1.3 M sec-butyl lithium solution with 600 g of dry, oxygen-free cyclohexane and slowly adding 16.8 g of deoxygenated 1,1'-diphenylethylene with stirring at room temperature, resulting in the formation of 1,1'-diphenylhexyllithium.

Deoxygenated MeFBSEMA monomer was purified by recrystallization from hot toluene, washed with anhydrous heptane, and dried overnight at room temperature in a vacuum oven. The purified MeFBSEMA monomer (400 g) was then diluted with 2000 g of toluene to form a solution having a solids concentration of about 20 wt %.

Deoxygenated t-butyl methacrylate monomer was pumped through a column (l=50 cm, d=2 cm) of basic alumina ($Al_2O_3$, Aldrich, Brockmann I, about 150 mesh, 58 Å).

The P(MeFBSEMA-t-BMA) was made in a stirred tube reactor (STR) having the following configuration. It had a capacity of 0.94 L and consisted of five jacketed (shell-and-tube) glass sections (Pyrex cylinders). The tube had an inner diameter of 3.01 cm and an outer diameter of 3.81 cm. The shell had a diameter of 6.4 cm. All five sections were 25.4 cm long. The sections were joined together with poly vinyl chloride (PVC) connector disks. The STR was closed off at the front with a polytetrafluoroethylene (PTFE) disk and at the end with a PVC disk. Extending through the center of the joined cylinders was a 0.95 cm diameter stainless steel shaft suspended along the cylinder axis by shaft alignment pins. To the shaft were affixed 30 detachable rectangular stainless steel paddles with approximately 2.1 cm between each paddle. The paddles were 1.6 mm thick, 1.91 cm wide, and 2.54 cm long. Each section contained six paddles. The shaft was attached to a 1/14 hp variable speed motor and driven at approximately 125 rpm. Heat transfer was accomplished by attachment of recirculators to the jackets. All zones were heated or cooled with water. Zones 1 and 2 were attached in series so that they were controlled at the same temperature by a recirculator (Model 9105, Fischer Scientific, Hanover Park, Ill.). Zone 1 was heated/cooled in a co-current manner while zone 2 was done in a counter-current fashion. Zone 3 was independently controlled using a separate recirculator (Model RTE 110, Thermo Neslab, Portsmouth, N.H.) and was heated/cooled in a counter-current manner. Zones 4 and 5 were attached in series so that they were controlled at the same temperature by a temperature controller (Model M3, MGW Lauda Lauda-Königshofen, Germany) and were heated/cooled in a counter-current manner.

The P(MeFBSEMA-t-BMA) material was made in the following manner. Purified t-BMA monomer (fed at a rate of 12 ml/min by a reciprocating piston pump), cyclohexane (fed at a rate of 17 ml/min by a reciprocating piston pump), and the initiator slurry in cyclohexane (pumped at a rate of 10 ml/min by a reciprocating piston pump) were fed into the first zone of the STR. A color change from clear to light green was observed in zone 1 when the initiator solution contacted the monomer. The temperature of the reaction mixture in each of the 5 zones of the STR was individually maintained at: #1=30° C., #2=30° C., #3=25° C., #4=25° C., and #5=25° C. The reaction mixture flowed through the first four zones facilitated by stirring paddles along the reaction path. Polymerization continued to substantially 100% completion by the end of zone 4, thereby forming a "living" poly(t-butyl methacrylate) reaction (P(t-BMA)) homopolymer.

Then the homopolymer was made into a block copolymer by feeding the MeFBSEMA solution into zone 5 of the STR, using a reciprocating piston pump at a rate of 7 ml/min, which reacted with (P(t-BMA)). The overall solids content after both polymerization reactions was about 29.7 wt %. The total residence time for the reactions was about 20 minutes. The result was (P(MeFBSEMA-t-BMA)) block copolymer with a mole ratio MeFBSEMA to t-BMA of 17 to 83, $M_n$ of $8.2 \times 10^4$ and a PDI of 1.97.

P(MeFBSEMA-t-BMA)(120 g) was loaded into the batch vacuum reactor set at 147° C. and agitated at a speed of 67 rpm to create a torque of 14 Nm. A vacuum of about 4.0 kPa (30 torr) was applied for 5 minutes to evaporate any residual solvent. The batch temperature of the reactor was increased to 160° C. Then p-toluenesulfonic acid monohydrate (1 g in 10 ml THF) was siphoned into the reactor and the internal vacuum of the reactor was re-established at about 4.0 kPa. After 15 minutes, the color of the modified starting material, P(MeFBSEMA-t-BMA), had changed from yellow to dark brown, and the measured torque had increased to 17 Nm. At this point, the contents of the reactor were sampled for analysis and removed from the reactor.

Samples were tested by Infrared Spectroscopy, which confirmed that hydrolysis had occurred. The spectra illustrated IR resonances (at $1802 \text{ cm}^{-1}$ and $1760 \text{ cm}^{-1}$) indicative of the formation of anhydride functionalities and the presence of methacrylic acid at 1709 cm$^{-1}$.

Example 12

Batch Synthesis of poly(styrene-b-methacrylic anhydride/acid-b-2-(N-methylperfluorobutanesulfonamido)ethyl Methacrylate)) via the p-toluenesulfonic acid Catalyzed Modification of poly(styrene-b-t-butyl methacrylate-b-2-(N-methylperfluorobutanesulfonamido)ethyl Methacrylate (P(S-t-BMA-MeFB-SEMA))

This example illustrates that semifluorinated methacrylic anhydride/acid triblocks can be made via the use of the vacuum reactor.

The P(S-t-BMA-MeFBSEMA) material was made by the method described in Example 11. An initiator slurry was prepared by mixing 115 g of 1.3 M sec-butyl lithium solution with 3000 g of dry, oxygen-free cyclohexane, with stirring, at room temperature. A 26 wt % solution of MeFBSEMA in toluene was prepared by dissolving 260 g of MeFBSEMA in 962 ml of toluene. A 2.5 wt % solution of 1,1'-diphenylethylene in cyclohexane, was prepared by mixing 33 g of 1,1'-diphenylethylene in 1273 g of pre-purified cyclohexane.

Purified styrene monomer (fed at a rate of 5.5 ml/min by a reciprocating piston pump), cyclohexane (fed at a rate of 11 ml/min by a reciprocating piston pump), and the initiator slurry in cyclohexane (pumped at a rate of 10 ml/min by a reciprocating piston pump) were fed into the first zone of the STR. A color change from clear to orange was observed in zone 1 when the initiator solution contacted the monomer. The temperature of the reaction mixture in each of the 5 zones of the STR was individually maintained at: #1=53° C., #2=53° C., #3=52° C., #4=47° C., and #5=25° C.

The materials flowed through the first zone forming a "living" polystyrene reaction mixture. At the start of zone 2, the 2.5 wt % solution of 1,1'-diphenylethylene in cyclohexane was added by a reciprocating piston pump (at a rate of 4.4 ml/min) to the "living" polystyrene reaction mixture, resulting in a 1,1'-diphenylethylene-modified polystyrenyl chain.

At the start of zone 3, purified t-BMA monomer (fed at a rate of 5.5 ml/min by a reciprocating piston pump) was added to the 1,1'-diphenylethylene-modified polystyryl chain and a color change from burgundy to light green was observed, indicative of a "living" poly(t-butyl methacrylate) chain.

At the start of zone 5 was added a 26 wt % solution of MeFBSEMA in toluene (by a reciprocating piston pump at a rate of 2.2 ml/min) which reacted with (P(t-BMA)) resulting in the formation of a P(S-t-BMA-MeFBSEMA) triblock copolymer. The overall solids content of this polymerization reaction was about 31 wt %. The total residence time for these reactions was about 29 minutes. The result was (P(MeFB-SEMA-t-BMA)) block copolymer with a mole ratio of PS to t-BMA to MeFBSEMA of 57.3 to 38.8 to 4.0 and M$_n$ of 3.5×10$^4$, with PDI of 1.9.

The P(S-t-BMA-MeFBSEMA) materials were collected in 1 gallon glass jars, concentrated under reduced pressure in a vacuum oven, and precipitated by adding the viscous solutions to methanol.

P(S—t-BMA-MeFBSEMA)(150 g) was loaded into the Batch Vacuum Reactor set at 160° C. and agitated at a speed of 67 rpm to create a torque of 18 Nm. A vacuum of about 533 Pa (4 torr) was applied for 5 minutes to evaporate any possible residual solvent. The batch temperature of the kneader was increased to 170° C. P-toluenesulfonic acid monohydrate (1 g in 10 ml THF) was siphoned into the reactor and the internal vacuum of the reactor was re-established at about 533 Pa. After 20 minutes the color of the modified starting material P(S—t-BMA-MeFBSEMA) had changed from white to dark brown, and the measured torque had increased to 31 Nm. At this point, the contents of the reactor were sampled for analysis and removed from the reactor.

Samples were tested by Infrared Spectroscopy, which confirmed that deesterification had occurred. The spectra illustrated IR resonances indicative of the formation of anhydride functionalities at 1802 cm$^{-1}$ and 1760 cm$^{-1}$ and the presence of methacrylic acid at 1709 cm$^{-1}$.

Example 13

Batch Synthesis of Hydrogenated poly(isoprene-methacrylic acid/anhydride) via the p-toluenesulfonic acid catalyzed deesterification of hydrogenated poly(isoprene-t-butyl methacrylate)

This example illustrates the deesterification of hydrogenated polyisoprene or polyolefin based block copolymer systems, such as polypropylene or polybutylene, and that the reaction products of the described process can be controlled by variation of the residence time for the reaction.

Example 13A is hydrogenated poly(isoprene-t-butyl methacrylate) made as follows would be suitable for the deesterification reaction:

A solution of poly(isoprene-t-butyl methacrylate)(4.3 g) in cyclohexane (500 ml) is added to a 2L stirred batch reactor (available as 316SS from pressure Products, Inc., Westminster, Pa.). To this solution was added 5% Palladium on BaSO$_4$ (5.5 g) (available from Strem Chemicals, Newburyport, Mass.) and the reactor was purged with nitrogen for 15 minutes. The reactor headspace was evacuated and charged with 689.5 kPa(100 psi) of hydrogen gas. The reactor was heated to 105° C. at which point the pressure in the reactor increased to 3447 kPa (500 psi). The reactor was stirred at this temperature for 12 hrs, after which the reactor was vented to remove hydrogen. The catalyst was filtered off through a 1 µm filter and the polymer was recovered by precipitation in methanol. Table 8 shows the composition of the resulting material.

TABLE 8

| Example | Hydrogenated PI mole % | 1,2-PI mole % | 3,4-PI mole % | 1,4-PI mole % | t-BMA mole % |
| --- | --- | --- | --- | --- | --- |
| 13A | 47.7 | 1.0 | 19.5 | 20.6 | 11.2 |

Examples 13B and 13C were the materials actually used for this example. They were prepared by Pressure Chemical Co. (Pittsburgh, Pa.), using a proprietary hydrogenation method. According to the Pressure Chemical method, the Poly(isoprene)-based systems were dissolved and loaded into agitated Parr vessels. After initial nitrogen sparging, these solutions were pressurized with hydrogen, agitated and heated to the targeted temperature. Table 9 summarizes the composition of the starting materials and the composition and properties of the resulting hydrogenated materials.

TABLE 9

| Ex. | Starting Material | Polymer (grams) | Cyclohexane (grams) | Toluene (grams) | $M_n$ (×10⁴) | PDI | Saturated Isoprene (mole %) | Unsaturated Isoprene (mole %) | TBMA (mole %) |
|---|---|---|---|---|---|---|---|---|---|
| 13B | PI-TBMA | 75 | 500 | 897 | 8.39 | 1.64 | 62.8 | 26.4 | 10.8 |
| 13C | PI-TBMA | 75 | 500 | 1428 | 7.77 | 1.65 | 55.1 | 32.2 | 12.7 |

The hydrogenated poly(isoprene)- t-butyl methacrylate (60 g) of example 13C was loaded into the batch vacuum reactor described in Example 1, set at 140° C., and agitated at a speed of 68 rpm to create a torque of 16 Nm. A vacuum of about 6.6 kPa (50 torr) was applied for 5 minutes to evaporate any solvent. The batch temperature of the reactor was increased to 148° C., p-toluenesulfonic acid monohydrate (0.5 g in 10 ml THF) was siphoned into the reactor, and the internal vacuum of the reactor was re-established at about 6.6 kPa. After 35 minutes, the color of the starting material, PPBI-t-BMA, had changed from yellow to dark brown, indicating a modification, and the measured torque had increased to 17 Nm. At this point, samples of the contents of the reactor were taken for analysis.

The samples were tested by Infrared Spectroscopy, which confirmed that deesterification had occurred. The spectra illustrated IR resonances indicative of the formation of anhydride functionalities at 1800 cm⁻¹ and 1758 cm⁻¹ and the presence of methacrylic acid at 1711 cm⁻¹.

The reaction was allowed to continue for an additional 35 minutes (total reaction time of 70 minutes). Samples were again taken and tested by Infrared Spectroscopy, which confirmed that deesterification had occurred. The spectra illustrated IR resonances indicative of the formation of anhydride functionalities at 1800 cm⁻¹ and 1758 cm⁻¹ and no methacrylic acid moieties were observed, indicating that 100% conversion had occurred.

Example 14

Batch synthesis of hydrogenated poly(isoprene-b-methacrylic acid) via the p-toluenesulfonic acid catalyzed solution deesterification of hydrogenated poly(isoprene-b t-butyl methacrylate)

This example illustrates the desterification of hydrogenated polyisoprene

To a stirred solution of hydrogenated poly(isoprene-b t-butyl methacrylate)(3.6 g) in toluene (50 ml) was added p-toluenesulfonic acid (0.05 g). The reaction mixture was heated to 80° C. for 8 hrs. Samples were tested by Infrared Spectroscopy, which confirmed that deesterification had occurred. The spectra illustrated IR resonances indicative of the formation of methacrylic acid at 1709 cm⁻¹.

Objects and advantages of this invention are further illustrated by the following examples. The particular materials and amounts thereof, as well as other conditions and details, recited in these examples should not be used to unduly limit this invention.

We claim:

1. A method for modifying a polymer comprising:
   providing a mixing apparatus having a high shear environment and devolatilization capabilities, wherein the mixing apparatus is a high viscosity devolatilizer or a devolatilizing kneader,
   introducing into the apparatus a composition containing at least one polymer with at least one fluorinated monomer or comonomer that is modified in the mixing apparatus by a thermally-induced reaction that removes at least one protective group to expose a functional group, and
   exposing the composition to the high shear environment under vacuum and at a temperature of about 100° C. to about 180° C., whereby the thermally-induced reaction occurs and solvent and volatile by-product is removed.

2. The method of claim 1 wherein the composition when introduced into the apparatus comprises 90 weight % solids or less.

3. The method of claim 1 wherein the composition comprises at least one polymer that is temperature sensitive.

4. The method of claim 1 further comprising an in situ chemical reaction at the functional group.

5. The method of claim 1 wherein the exposed functional group is capable of undergoing a grafting reaction.

6. The method of claim 1 wherein the thermally-induced reaction comprises the elimination of isobutylene and water from methacrylic and acrylic esters to produce one or both of acid and anhydride functionalities.

7. The method of claim 4 wherein the chemical reaction comprises forming a graft polymer.

8. The method of claim 1 wherein the fluorinated comonomer contains at least one mer unit having the formula

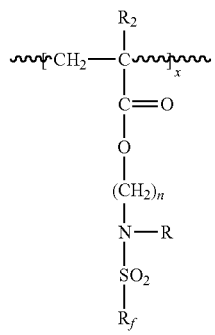

where ⌇⌇ represents a bond in a polymerizable or polymer chain; $R_f$ is —$C_6F_{13}$, —$C_4F_9$, or —$C_3F_7$; R and $R_2$ are each independently hydrogen or alkyl of 1 to 20 carbon atoms; n is an integer from 2 to 11; and x is an integer of at least 1.

9. The method of claim 6 wherein the reaction is catalyzed.

10. The method of claim 6 wherein the reaction is acid-catalyzed.

11. The method of claim 1 wherein the thermally-induced reaction comprises the elimination of trialkylsilanes from trialkylsiloxy end or side group containing polymers to produce hydroxyl end or side group functional polymers.

12. The method of claim 1 wherein the thermally-induced reaction comprises the elimination of trialkylsilanes from polymer end or side groups to produce amino end or side group functional polymers.

13. The method of claim 1 wherein the thermally-induced reaction comprises a deesterification reaction to produce hydroxyl- or carboxylic acid-functionalized polymers.

14. The method of claim 13 wherein the reaction is base-catalyzed.

15. The method of claim 1 wherein the thermally-induced reaction comprises the elimination of $N_2$ from acyl azides and subsequent rearrangement to form isocyanate functionality.

16. The method of claim 1 wherein the functional group is ethylenically or acetylenically unsaturated.

17. The method of claim 16 wherein the thermally-induced reaction comprises the elimination of benzenesulfenic acid from poly(vinyl phenyl sulfoxide) to produce polyacetylene-containing polymers.

18. The method of claim 1 wherein the thermally-induced reaction comprises the elimination of trialkylsilanes from trialkylsilthiane end or sidegroup containing polymers to produce thiol end or sidegroup functional polymers.

19. The method of claim 1 wherein the thermally-induced reaction comprises the elimination of trialkylsilanes from trialkylsilyl-substituted ethynyl monomers, such as 2-, 3- and 4-[(trimethylsilyl)-ethynyl]styrenes, producing ethynyl-containing side-group or end functionalized polymers.

* * * * *

UNITED STATES PATENT AND TRADEMARK OFFICE
CERTIFICATE OF CORRECTION

PATENT NO. : 7,632,916 B2
APPLICATION NO. : 10/211415
DATED : December 15, 2009
INVENTOR(S) : James M. Nelson It is certified that error appears in the above-identified patent and that said Letters Patent is hereby corrected as shown below:

Column 3
Line 1, after "1." delete "5".

Column 7
Line 1, delete "26660 Pa)" and insert -- 26600 Pa) --, therefor.

Column 8
Line 11, after "10/211,096," insert -- [attorney docket number 57707US002] --, therefor.

Column 9
Line 62, after "096." insert -- [attorney docket number 57707US002] --, therefor.

Column 16
Line 48, delete "H1" and insert -- $H^1$ --, therefor.

Column 18
Line 38, delete "(temperature Ti)," and insert -- (temperature T1), --, therefor.

Column 21
Line 32, delete "(P(S-1-t-BMA))" and insert -- (P(S-I-t-BMA)) --, therefor.

Column 29
Line 65, delete "P(S— t-BMA-MeFBSEMA)(150 g)" and insert
-- P(S- t-BMA-MeFBSEMA) (150 g) --, therefor.

Column 30
Line 7, delete "P(S— t-BMA-MeFBSEMA)" and insert
-- P(S- t-BMA-MeFBSEMA) --, therefor.

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,632,916 B2  Page 1 of 1
APPLICATION NO. : 10/211415
DATED : December 15, 2009
INVENTOR(S) : Nelson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Second Day of November, 2010

David J. Kappos
*Director of the United States Patent and Trademark Office*